United States Patent
Nam et al.

(10) Patent No.: US 10,936,118 B2
(45) Date of Patent: Mar. 2, 2021

(54) TOUCH DETECTION DEVICE AND METHOD OF DETECTING TOUCH

(71) Applicant: SAMSUNG ELECTRONICS CO., LTD., Suwon-si (KR)

(72) Inventors: Sang-Pil Nam, Pohang-si (KR); Kyung-Hoon Lee, Seoul (KR); Michael Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 15/974,953

(22) Filed: May 9, 2018

(65) Prior Publication Data
US 2019/0102034 A1 Apr. 4, 2019

(30) Foreign Application Priority Data

Sep. 29, 2017 (KR) .......................... 10-2017-0128305

(51) Int. Cl.
| | |
|---|---|
| *G06F 3/041* | (2006.01) |
| *G06F 3/044* | (2006.01) |
| *G06F 3/0354* | (2013.01) |
| *G06F 3/038* | (2013.01) |

(52) U.S. Cl.
CPC ...... *G06F 3/041661* (2019.05); *G06F 3/0383* (2013.01); *G06F 3/03545* (2013.01); *G06F 3/03547* (2013.01); *G06F 3/0446* (2019.05); *G06F 3/04182* (2019.05); *G06F 3/04184* (2019.05); *G06F 3/0412* (2013.01); *G09G 2310/0264* (2013.01)

(58) Field of Classification Search
CPC combination set(s) only.
See application file for complete search history.

(56) References Cited

U.S. PATENT DOCUMENTS

| | | | |
|---|---|---|---|
| 6,914,595 B1 | 7/2005 | Kobayashi et al. | |
| 9,280,231 B2 | 3/2016 | Small et al. | |
| 9,519,387 B2 | 12/2016 | Kim et al. | |
| 2012/0001857 A1* | 1/2012 | Chang ................. | G06F 3/04182 345/173 |
| 2013/0058437 A1* | 3/2013 | Oshima ............... | H03M 1/0836 375/316 |

(Continued)

FOREIGN PATENT DOCUMENTS

| | | |
|---|---|---|
| KR | 10-2013-0078116 | 7/2013 |
| KR | 10-2014-0096414 | 1/2014 |

(Continued)

*Primary Examiner* — William Boddie
*Assistant Examiner* — Alecia D English
(74) *Attorney, Agent, or Firm* — Volentine, Whitt & Francos, PLLC

(57) ABSTRACT

A touch detection device and a method of detecting a touch employ: a current-to-voltage converter configured to convert a reception signal received from a touch panel into a sensing signal, and further configured to be periodically reset for a first time period in response to a reset signal; a digital-to-analog converter configured to convert an analog signal based on the sensing signal into a first digital output signal, and a controller configured to generate a second digital output signal based on the first digital output signal by performing data interpolation on a first portion of the first digital output signal corresponding to the first time period.

17 Claims, 19 Drawing Sheets

(56) References Cited

U.S. PATENT DOCUMENTS

| | | | |
|---|---|---|---|
| 2015/0169123 A1* | 6/2015 | Lee | G06F 3/0418 345/174 |
| 2015/0236887 A1* | 8/2015 | Kaukovuori | H04B 1/30 375/349 |
| 2015/0268782 A1* | 9/2015 | Kim | H04N 5/23245 345/174 |
| 2015/0277653 A1 | 10/2015 | Xiong et al. | |
| 2016/0124544 A1 | 5/2016 | Kang et al. | |
| 2016/0224163 A1 | 8/2016 | Kim et al. | |
| 2017/0322664 A1 | 11/2017 | Park et al. | |

FOREIGN PATENT DOCUMENTS

| | | |
|---|---|---|
| KR | 10-2014-0010714 | 8/2014 |
| KR | 10-1714315 | 3/2017 |

\* cited by examiner

TOUCH DETECTION DEVICE AND METHOD OF DETECTING TOUCH

CROSS-REFERENCE TO RELATED APPLICATION

This application claims the benefit of Korean Patent Application No. 10-2017-0128305, filed on Sep. 29, 2017, in the Korean Intellectual Property Office, the disclosure of which is incorporated herein in its entirety by reference.

BACKGROUND

The inventive concept of the present disclosure relates to touch detection of a pointer, and more particularly, to a touch detection device and method of detecting a touch.

Touch panels are mounted on various electronic devices. The touch panels may provide a region which a pointer outside an electronic device may touch, and may include a plurality of electrodes for detecting the pointer. Touch coordinates of the pointer touched on the touch panel may be recognized by processing signals provided from at least one of the plurality of electrodes in the touch panel. Furthermore, when the pointer is touched on the touch panel, the electronic device may additionally provide various functions by recognizing touch pressure caused by the pointer as well as the touch coordinates. A signal provided from the touch panel may include noise generated inside and/or outside the electronic device, and by removing the noise, the touch of the pointer may be more accurately detected.

SUMMARY

According to an aspect of the inventive concept, there is provided a device for more accurately detecting a touch of a pointer by reducing or removing display noise from a signal received from a touch panel.

According to another aspect of the inventive concept, there is provided a method of more accurately detecting a touch of a pointer by reducing or removing display noise from a signal received from a touch panel.

According to an aspect of the inventive concept, there is provided a touch detection device, the touch detection device includes: a current-to-voltage converter configured to convert a reception signal received from a touch panel into a sensing signal and be periodically reset for a first time period in response to a reset signal, an analog-to-digital converter configured to convert an analog signal, generated based on the sensing signal, into a first digital output signal; and a controller configured to generate a second digital output signal based on the first digital output signal by performing data interpolation on a first portion of the first digital output signal, where the first portion of the first digital output signal corresponds to the first time period.

According to another aspect of the inventive concept, there is provided a touch detection device for processing a reception signal that varies with a touch of a pointer on a touch panel. The touch detection device includes: an analog front end configured to generate a first output signal by converting and amplifying the reception signal, wherein the analog front end is periodically reset in response to a reset signal to generate the first output signal having non-continuous data values; and a controller configured to generate a second output signal having continuous data values by interpolating a non-continuous period of the first output signal having the non-continuous data values based on data values of a continuous period, and further configured to detect a frequency of the second output signal.

According to another aspect of the inventive concept, there is provided a touch detection device for processing a reception signal that varies with a touch of a pointer on a touch panel, the touch detection device includes: an analog front end configured to generate a first output signal by converting and amplifying the reception signal, and a controller configured to interpolate a second data value of a second period of the first output signal based on a first data value of a first period of the first output signal, prior to the second period, and a third data value of a third period of the first output signal, subsequent to the second period.

According to another aspect of the inventive concept, there is provided a method of detecting a touch by processing a reception signal that varies with a touch of a pointer on a touch panel. The method includes: generating an output signal based on the reception signal, wherein the output signal as data values corresponding to a variation of the reception signal; generating a reconstructed output signal by interpolating at least one data value of a second period of the output signal between a first period of the output signal and a third period of the output signal. based on a data value of the first period and a data value of the third period; and detecting a magnitude and frequency of the reconstructed output signal.

According to yet another aspect of the inventive concept, a device, comprises: an analog front end (AFE) configured to receive a reception signal from a touch panel, where the reception signal varies with a touch of a pointer on a touch panel, and in response thereto to output a first digital signal having a plurality of data values which vary with the touch of the pointer on the touch panel; and a controller configured to receive the first digital signal and in response thereto to output a second digital signal, wherein the controller is configured to substitute one or more of the data values of the first digital signal with interpolated data values to generate the second digital signal, wherein the one or more data values correspond to a first time period when a noise level in the reception signal is greater than at other time periods.

BRIEF DESCRIPTION OF THE DRAWINGS

Embodiments of the inventive concept will be more clearly understood from the following detailed description taken in conjunction with the accompanying drawings.

DETAILED DESCRIPTION OF THE EMBODIMENTS

Hereinafter, embodiments of the present disclosure will be described with reference to the accompanying drawings.

Figure 1:
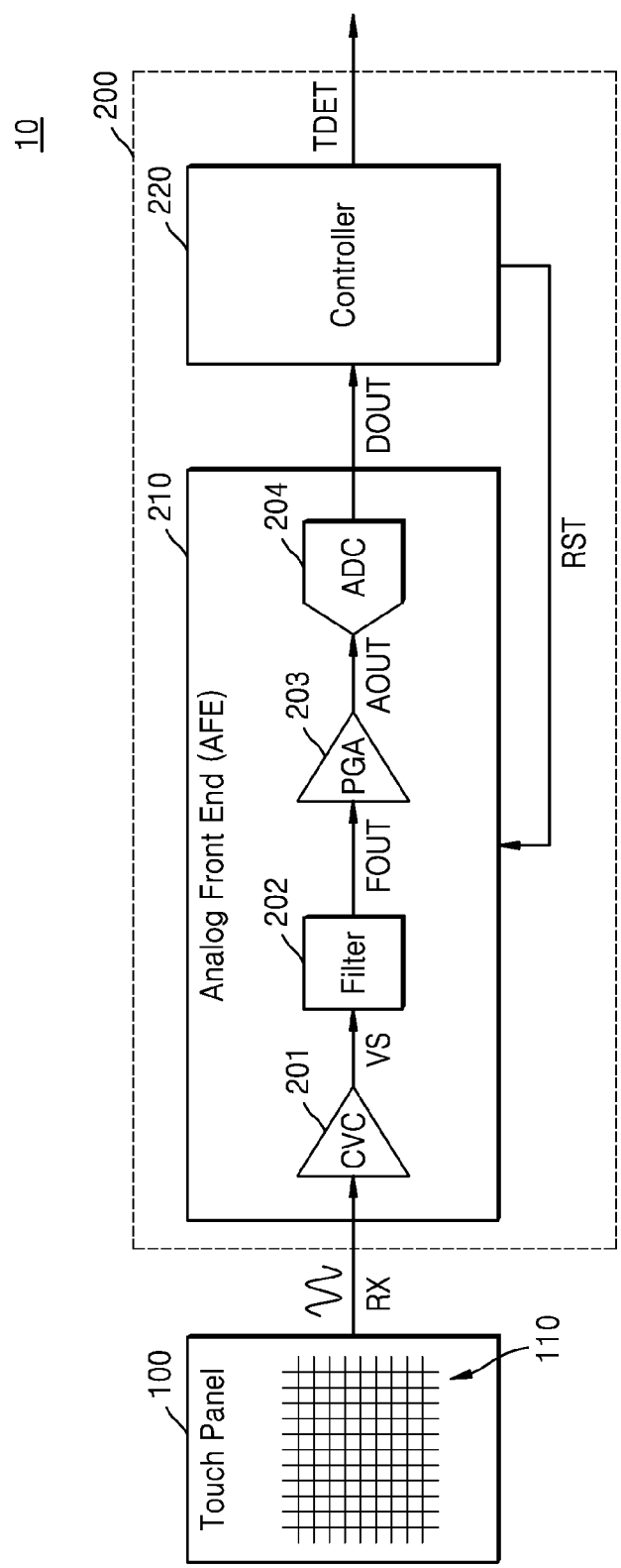
FIG. 1 is a block diagram of an example embodiment of a touch detection device.
Figure 2:
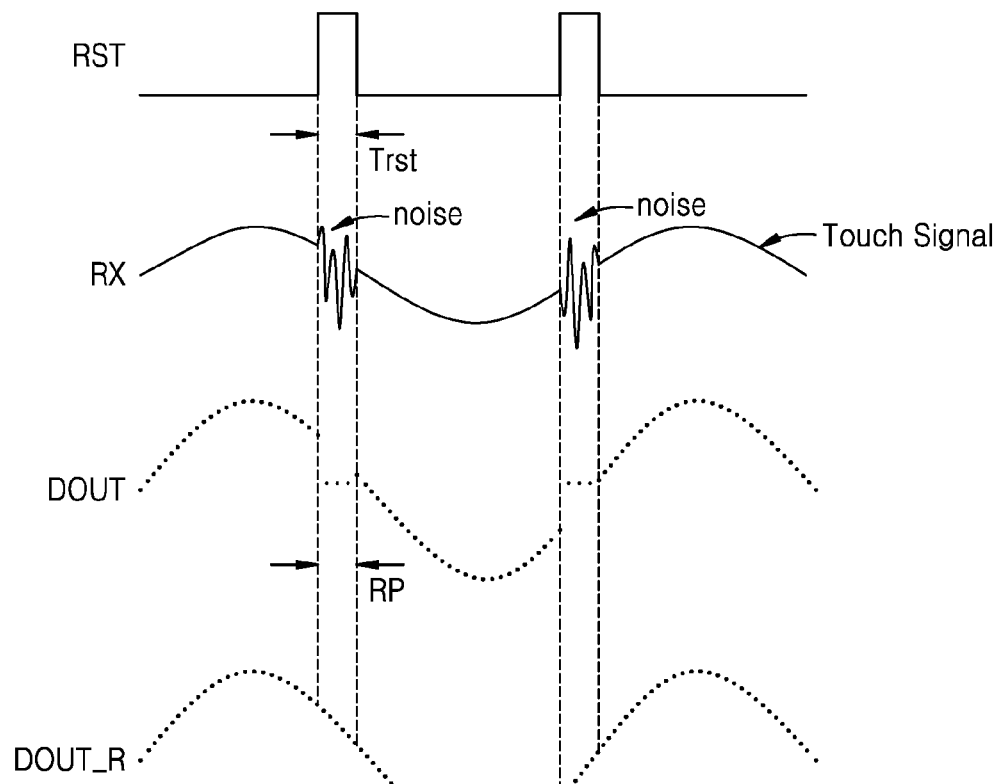
FIG. 2 is a graph showing waveforms of signals of the touch detection device of FIG. 1 in the time domain.

FIG. 1 is a block diagram of an example embodiment of a touch detection device 10, and FIG. 2 is a graph showing waveforms of signals of touch detection device 10 of FIG. 1 in the time domain.

Touch detection device 10 may be mounted on various electronic devices having a touch recognition function. For example, touch detection device 10 may be mounted on electronic devices, such as a personal computer (PC), a network server, a tablet PC, an e-reader, a personal digital assistant (PDA), a portable multimedia player (PMP), a mobile phone, an Internet of Things (IoT) device, a refrigerator, and a navigation device. Furthermore, touch detection device 10 may be mounted on an electronic device provided as a part in a vehicle, furniture, a manufacturing facility, a door, and various measuring instruments.

Referring to FIG. 1, touch detection device 10 may include a touch panel 100, an analog front end (AFE) 210, and a controller 220. AFE 210 and controller 220 may constitute a touch detection circuit 200 that processes a reception signal RX (or an input signal) provided by touch panel 100 to thereby detect a touch. AFE 210 and controller 220 may be integrated in one semiconductor chip or integrated in different semiconductor chips. Although touch detection device 10 of FIG. 1 includes touch panel 100, touch detection circuit 200 including AFE 210 and controller 220 may be referred to as a touch detection device, without touch panel 100.

Touch panel 100 may include a plurality of electrodes 110. For example, the plurality of electrodes 110 may include first electrodes extending in a first direction and second electrodes extending in a second direction. The first and second electrodes may each operate as a driving electrode for receiving a transmission signal from the outside and/or a sensing electrode for providing a reception signal to the outside of touch panel 100.

Among sensing electrodes, a sensing electrode arranged at a point to which a pointer is touched may provide a different reception signal than the other sensing electrodes, due to a capacitance changed by the pointer or a signal provided from the pointer. In other words, the reception signal RX may include a touch signal generated by a touch of a pointer. In this case, the touch of the pointer to touch panel 100 may include not only a case where the pointer contacts touch panel 100, but also a case where the pointer is close to touch panel 100.

The pointer may refer to any object that may cause a change in a reception signal (e.g., the reception signal RX) output by touch panel 100 by touching or nearly touching touch panel 100. For example, the pointer may be a part (e.g., a finger) of a body part of a user of an electronic device on which touch detection device 10 is mounted, may be an item (e.g., gloves, a touch pen, or a stylus pen) the user wears or uses, or may be a part of another system whose position varies with operation.

As described below, as a reception signal (e.g., the reception signal RX) output by touch panel 100 is processed, touch pressure applied to touch panel 100 by the pointer, as well as the position of a pointer touched on touch panel 100, for example, the coordinates on touch panel 100, may be recognized, and accordingly, an electronic device on which touch detection device 10 is mounted may provide additional functions depending on the pressure of the pointer.

AFE 210 may receive the reception signal RX (or an input signal) from touch panel 100 and may process the reception signal RX to thereby generate an output signal DOUT corresponding to the reception signal RX. The reception signal RX received from touch panel 100 may be an analog signal which varies in response to a touch of a pointer. For example, the reception signal RX may be an alternating current signal. The output signal DOUT may be a digital signal having a data value varying with a variation of the reception signal RX. AFE 210 may convert the reception signal RX into an output signal DOUT including digital values corresponding to the reception signal RX so that controller 220 may easily detect a touch of a pointer. For example, AFE 210 may convert and/or amplify the reception signal RX and/or remove noise in the reception signal RX.

AFE 210 may include an input buffer 201, a filter 202, an amplifier 203, and an analog-to-digital converter 204 (hereinafter, referred to as an ADC). Input buffer 201, filter 202, amplifier 203, and ADC 204 may constitute one receiver for processing one reception signal RX provided from touch panel 100. Although AFE 210 in FIG. 1 includes one receiver for convenience of description, AFE 210 may receive a plurality of reception signals from touch panel 100 and may include a plurality of receivers that simultaneously process the plurality of reception signals. In an embodiment, AFE, 210 may further include a transmitter that provides a transmission signal to electrodes 110 of touch panel 100.

Input buffer 201 may receive a touch signal by converting the reception signal RX provided from touch panel 100 into a sensing signal VS. In some embodiments, the reception signal RX may be a current signal, and the sensing signal VS may be a voltage signal. In that case, input buffer 201 may be referred to as a current-voltage converter. The reception signal RX may be a varying alternating current. Input buffer 201 may function as a current amplifier or a current-voltage converter and generate a sensing signal VS that varies according to or corresponding to the reception signal RX.

Filter 202 may attenuate one or more frequency bands among frequency bands of the sensing signal VS in order to reduce noise. Filter 202 may be a switched capacitor filter or discrete-time filter including a plurality of unit capacitors and may be a continuous-time filter including at least one active element or passive element.

Filter 202 may have a set pass band and a stop band having a boundary of at least one cutoff frequency. The reception signal RX may include a touch signal and noise according to or in response to a touch of a pointer, and the sensing signal VS generated by converting the reception signal RX may also include a touch signal and noise. A frequency band of the touch signal and a frequency band of the noise may be different from each other, and the set pass band of filter 202 may be set to include the frequency band due to the touch signal. Accordingly, filter 202 may remove some or all of the frequency band due to the noise among the frequency bands of the sensing signal VS, thereby generating a filter output signal FOUT from which small or all noise is removed and including the touch signal.

Amplifier 203 may generate an analog output signal AOUT by amplifying the filter output signal FOUT with a set gain Amplifier 203 may be implemented as a variable gain amplifier or a programmable gain amplifier. In an embodiment, the gain of amplifier 203 may be set according to a control signal provided from controller 220.

ADC 204 may generate a digital output signal DOUT by digitally converting the analog output signal AOUT. ADC 204 may sample the analog output signal AOUT based on a sampling frequency and convert a sampling value to a data value (or digital code). The sampling frequency may be set to be relatively higher than the frequency of the analog output signal AOUT so that data values corresponding to a plurality of sampling values sufficiently reflect the fluctuation of the analog output signal AOUT.

In an embodiment, AFE 210 may be reset (or held) for a predetermined time period in response to a reset signal RST to avoid noise when processing the reception signal RX to thereby generate the data signal DOUT.

Referring to FIG. 2, the reception signal RX may include a touch signal, and noise may be in the reception signal RX. The reset signal RST may be set to have an active level, e.g., a high level, in a period (i.e., an interval) in which noise is in the reception signal RX. A period in which the reset signal RST has the active level, that is, an active period of the reset signal RST, may be referred to as a reset period Trst. In an embodiment, noise may periodically occur in the reception signal RX. Therefore, the reset signal RST may be set as a periodic signal having an active level periodically.

AFE 210 may be reset in the reset period Trst in response to the reset signal RST. In the reset period Trst, AFE 210 may not perform an operation of converting and amplifying the reception signal RX, thereby avoiding the noise. Specifically, at least one of input buffer 201, filter 202, and amplifier 203 provided in AFE 210 may be reset in response to the reset signal RST. Therefore, a data value (or data values) of a reset data period RP of the output signal DOUT, which corresponds to the reset period Trst of the reset signal RST, may have a value independent of the reception signal RX. In an embodiment, the data value of the reset data period RP of the output signal DOUT may be constant.

Referring back to FIG. 1, controller 220 may control AFE 210 and detect a touch of a pointer based on the output signal DOUT provided by AFE 210 to generate a touch detection signal TDET. Controller 220 may be implemented with a digital signal processor, a microprocessor, a dedicated processor, or the like.

For example, controller 220 may detect touch coordinates and touch pressure based on the magnitude and the frequency of the output signal DOUT and may generate a touch detection signal TDET including information about the touch coordinates and the touch pressure. Controller 220 may control the reset of AFE 210 by providing AFE 210 with the reset signal RST. Controller 220 may generate the reset signal RST based on a timing signal provided from the outside, or may determine a period in which noise is in the reception signal RX, based on the output signal DOUT provided from AFE 210, and generate the reset signal RST based on a result of the determination. In addition, controller 220 may set the gain of amplifier 203.

As described above, when AFE 210 is reset in response to the reset signal RST, noise may be avoided since the data value (or data values) of the reset data period RP of the output signal DOUT is a value independent of the reception signal RX, but a touch signal may also not be reflected. As shown in FIG. 2, the output signal DOUT has data values according to or corresponding to a touch signal in a period other than the reset data period RP, but has a data value independent of the touch signal in the reset data period RP. Also, even if AFE 210 is not reset, the reset data period RP of the output signal DOUT may have noise data values that do not properly reflect a touch signal, due to noise introduced in the reception signal RX. Therefore, the reset data period RP of the output signal DOUT has non-continuous data values. In this case, when the data values are non-continuous, it means that the data values change abruptly or the data values do not change. As a result, controller 220 may not extract accurate magnitude and frequency information from the output signal DOUT, and when touch coordinates and a pressure are detected based on the magnitude and frequency of the output signal DOUT, an error may occur in touch pressure.

However, controller 220 according to the present embodiment may interpolate the data value(s) of the reset data period RP of the output signal DOUT to generate a reconstructed output signal DOUT_R as shown in FIG. 2, and may extract magnitude and frequency information based on the reconstructed output signal DOUT_R. In other words, controller 220 may apply a data interpolation method to the output signal DOUT to thereby restore or reconstruct data values for a touch signal with respect to the reset data period RP of the output signal DOUT.

Controller 220 may generate the data value(s) of the reset data period RP based on data values of a previous a period and a following period of the reset data period RP among data values of the output signal DOUT. Controller 220 may use various data interpolation methods to generate the data value(s) of the reset data period RP. The reconstructed output signal DOUT_R may have continuous data values. Controller 220 may extract correct magnitude and frequency information from the reconstructed output signal DOUT_R.

The reception signal RX provided from touch panel 100 may include various pieces of noise. The reception signal RX may be varied by various pieces of noise as well as pointers. For example, the reception signal RX may include noise generated from other components in the electronic device, lights outside touch panel 100, a charger connected to the electronic device, a display panel, and/or the like. Touch detection may be inaccurate due to the influence of the noise.

However, in touch detection device 10 according to the example embodiment of the present disclosure, AFE 210 is reset (or held) during a period in which noise is in the reception signal RX, and thus, noise may be avoided. In addition, controller 220 may reconstruct the output signal DOUT by restoring a touch signal in the reset period Trst through a data interpolation method, and may perform touch detection based on the reconstructed output signal DOUT_R. Therefore, touch detection device 10 according to the embodiment of the present disclosure may minimize the influence of noise and improve the accuracy of touch detection.

Figure 3A:
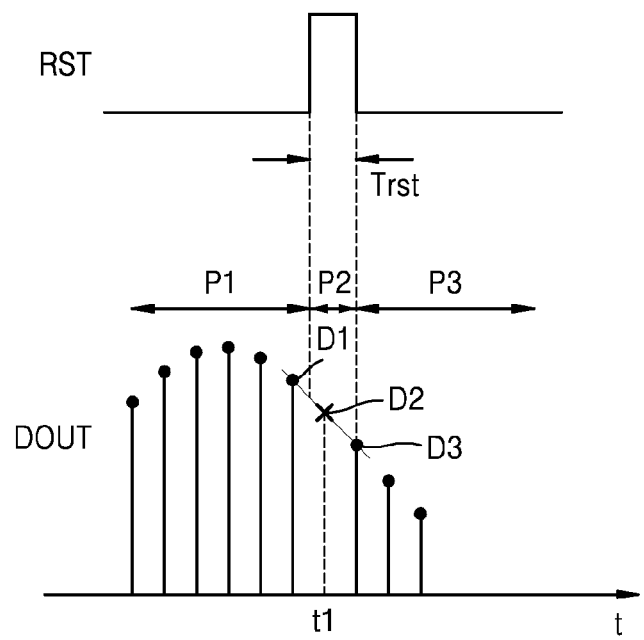
FIGS. 3A and 3B are diagrams illustrating an example embodiment of a data interpolation method.
Figure 3B:
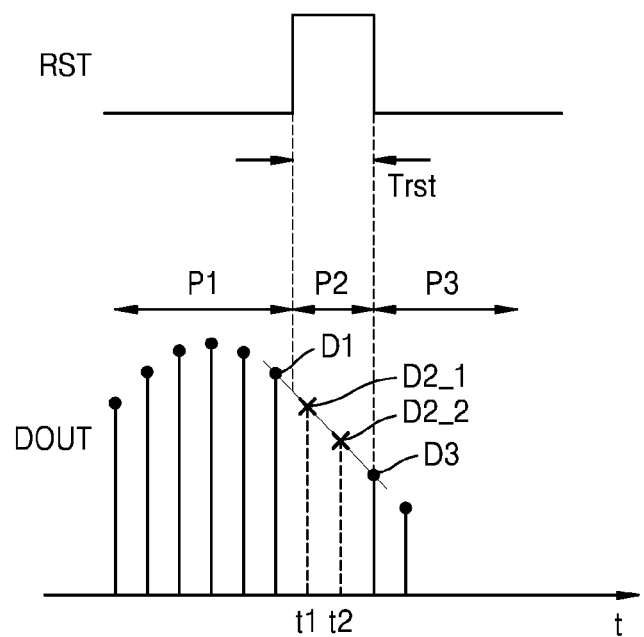

FIGS. 3A and 3B are diagrams illustrating an example embodiment of a data interpolation method.

The data interpolation method illustrated in FIGS. 3A and 3B may be performed by controller 220 of FIG. 1.

The output signal DOUT includes data values output from ADC 204, and the data values may vary with time. As described above, a data value of a reset data period of the output signal DOUT corresponding to the reset period Trst of the reset signal RST, for example, a data value of a second period P2 of FIGS. 3A and 3B, may not reflect a touch signal due to noise. Therefore, in order to generate a data value reflecting a touch signal, controller 220 may interpolate the data value(s) of the second period P2 based on data values of first and third periods P1 and P3 of the output signal DOUT. In this case, the first period P1 and the third period P3 of the output signal DOUT may be referred to as a continuous period including continuous data values, and the second period P2 may be referred to as a non-continuous period including at least one non-continuous data value.

For example, controller 220 may interpolate the data value(s) of the second period P2 by using linear interpolation, as shown in FIGS. 3A and 3B. Controller 220 may generate at least one data value (data value D2 in FIG. 3A and data values D2_1 and D2_2 in FIG. 3B) of the second period P2 based on data values corresponding to a time point closest to the second period P2 of the output signal DOUT, for example, a data value D1 and a data value D3.

As shown in FIG. 3A, when the output signal DOUT includes one data value at time t1 of the second period P2 (for example, when the second period P2 is less than twice a sampling cycle), an intermediate value between the data value D1 and the data value D3, for example, a value obtained by dividing the sum of the data value D1 and the data value D3 by 2, may correspond to the data value D2 at the time t1.

As shown in 3B, when the output signal DOUT includes data values at time t1 and time t2 of the second period P2 (for example, when the second period P2 is greater than twice the sampling cycle and less than three times the sampling cycle), a larger one of intermediate values generated by dividing the sum of the data value D1 and the data value D3 by 1/3 and 2/3 may correspond to the data value D2_1 at the time t1, and a smaller value of the intermediate values may correspond to the data value D2_2 at the time t2.

A data interpolation method performed by controller 220 of FIG. 1 has been described with reference to FIGS. 3A and 3B. However, the present disclosure is not limited thereto, and various data interpolation methods may be used.

Figure 4:
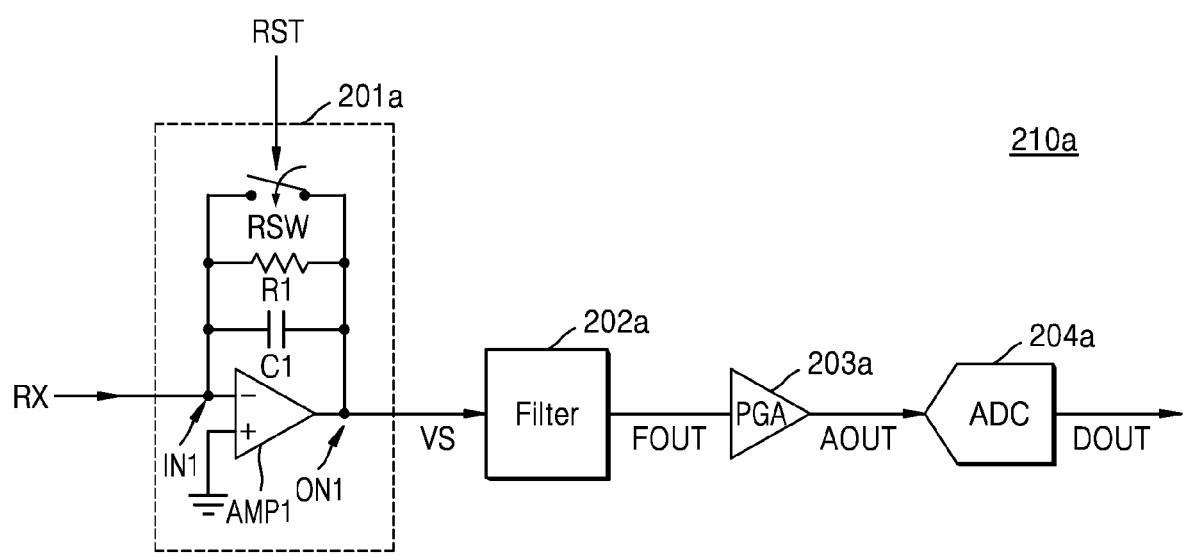
FIG. 4 is a circuit diagram of an example embodiment of an analog front end (AFE).

FIG. 4 is a circuit diagram of an example embodiment of an AFE 210a. Referring to FIG. 4, AFE 210a may include an input buffer 201a, a filter 202a, an amplifier 203a, and an ADC 204a.

AFE 210a of FIG. 4 is an implementation example of AFE 210 of FIG. 1. The description of input buffer 201, filter 202, amplifier 203, and ADC 204, given with reference to FIG. 1, may be applied to input buffer 201a, filter 202a, amplifier 203a, and ADC 204a, respectively, in FIG. 4, and thus a redundant description will be omitted.

In AFE 210a, input buffer 201a may be reset in response to a reset signal RST.

Input buffer 201a may include an operational amplifier AMP, a resistor R1 and a capacitor C1, and may be implemented as a current-to-voltage converter in which the resistor R1 and the capacitor C1 are connected in parallel between an input terminal IN1 and an output terminal ON1.

A reset switch RSW may be connected between the input terminal IN1 and the output terminal ON1, and the reset switch RSW may be turned on in response to an activated reset signal RST. For example, the reset switch RSW may be turned on in response to an active level of the reset signal RST, e.g., a high level.

When the reset switch RSW is in a turned-off state, input buffer 201a may output a sensing signal VS corresponding to a reception signal RX. The sensing signal VS may vary in response to a variation in the reception signal RX. When the reset switch RSW is turned on, the input terminal IN1 and the output terminal ON1 may be directly connected to each other and an operation in which input buffer 201a converts the reception signal RX into the sensing signal VS may be stopped. In this state, input buffer 201a may output a sensing signal VS independent of the reception signal RX, for example, a sensing signal VS having a fixed level. Accordingly, when the reset switch RSW is turned on the output signal DOUT output by converting and amplifying the sensing signal VS through filter 202a, amplifier 203a and ADC 204a may also have a data value independent of the reception signal RX.

As described above, according to the present embodiment, as input buffer 201a is reset in response to the reset signal RST, AFE 210a may be reset.

Figure 5:
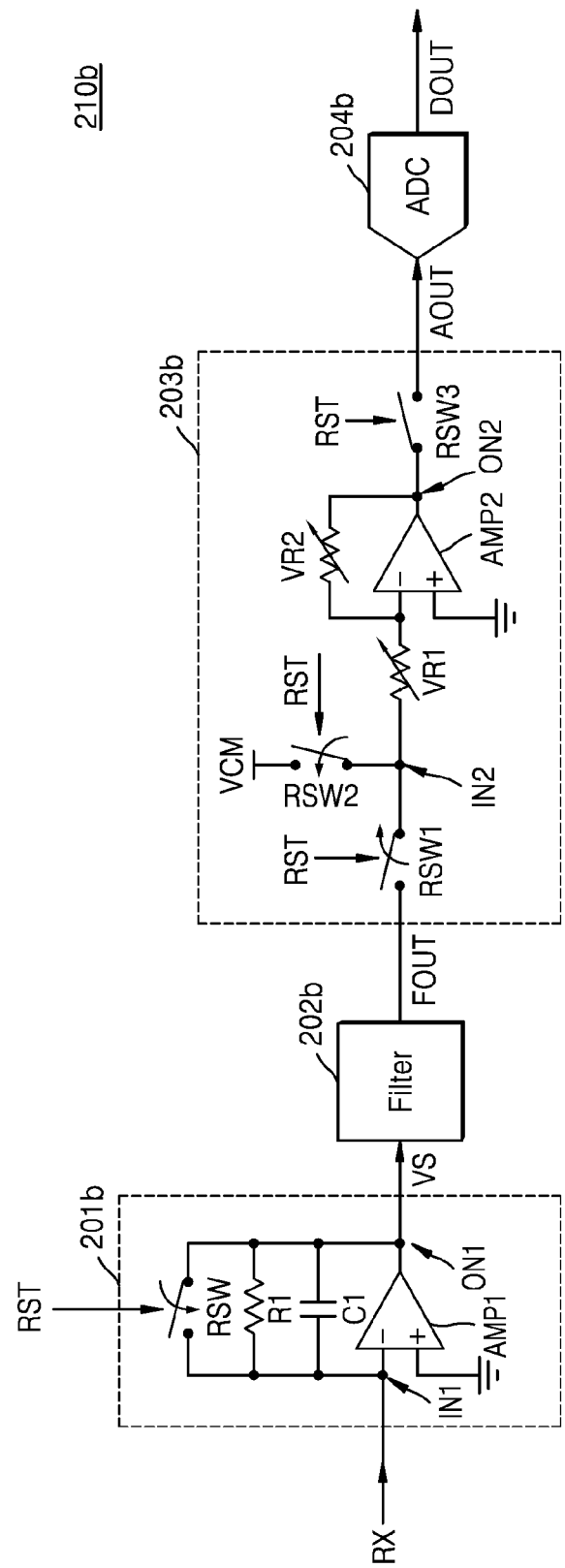
FIG. 5 is a circuit diagram of another example embodiment of an AFE.

FIG. 5 is a circuit diagram of an example embodiment of an AFE 210b. Referring to FIG. 5, AFE 210b may include an input buffer 201b, a filter 202b, an amplifier 203b, and an ADC 204b.

AFE 210b of FIG. 5 is an implementation example of AFE 210 of FIG. 1. The description of input buffer 201, filter 202, amplifier 203, and ADC 204, given with reference to FIG. 1, may be applied to input buffer 201b, filter 202b, amplifier 203b, and ADC 204b, respectively, and thus a redundant description will be omitted.

In AFE 210b, input buffer 201b and amplifier 203b may be reset in response to a reset signal RST.

The configuration and operation of input buffer 201b are the same as those of input buffer 201a of FIG. 4, and a redundant description will be omitted.

Amplifier 203b may include an operational amplifier AMP2 and variable resistors VR1 and VR2 and may amplify a filter output signal FOUT with a gain set according to a resistance value ratio between the variable resistors VR1 and VR2.

Amplifier 203b may further include first and second reset switches RSW1 and RSW2 connected to an input terminal IN2. The first reset switch RSW1 may be turned off in response to an activated reset signal RST to block an electrical connection between the output terminal of filter 202b and the input terminal IN2 during a reset period Trst. The filter output signal FOUT is not transmitted to amplifier 203b in the reset period Trst. The second reset switch RSW2 may be turned on in response to the activated reset signal RST to provide a common mode voltage VCM to the input terminal IN2. For example, the common mode voltage VCM may be the ground voltage. Amplifier 203b may output the ground voltage, or another voltage having a fixed level, as an analog output signal AOUT in the reset period Trst. In an embodiment, amplifier 203b may further include a third reset switch RSW3 connected to the output terminal ON2 and the third reset switch RSW3 may be turned off in response to the activated reset signal RST to prevent the output of amplifier 203b from being output to ADC 204b. Accordingly, an output signal DOUT output from ADC 204b in the reset period Trst may have a data value independent of the reception signal RX.

In FIGS. 4 and 5, circuits in input buffers 201a and 201b and amplifier 203b are merely examples for convenience of illustration, and input buffers 201a and 201b and amplifier 203b may include circuits different from the circuits shown in FIGS. 4 and 5. For example, input buffers 201a and 201b and amplifier 203b may further include other components, or may include other components that replace the components shown in FIGS. 4 and 5.

Figure 6:
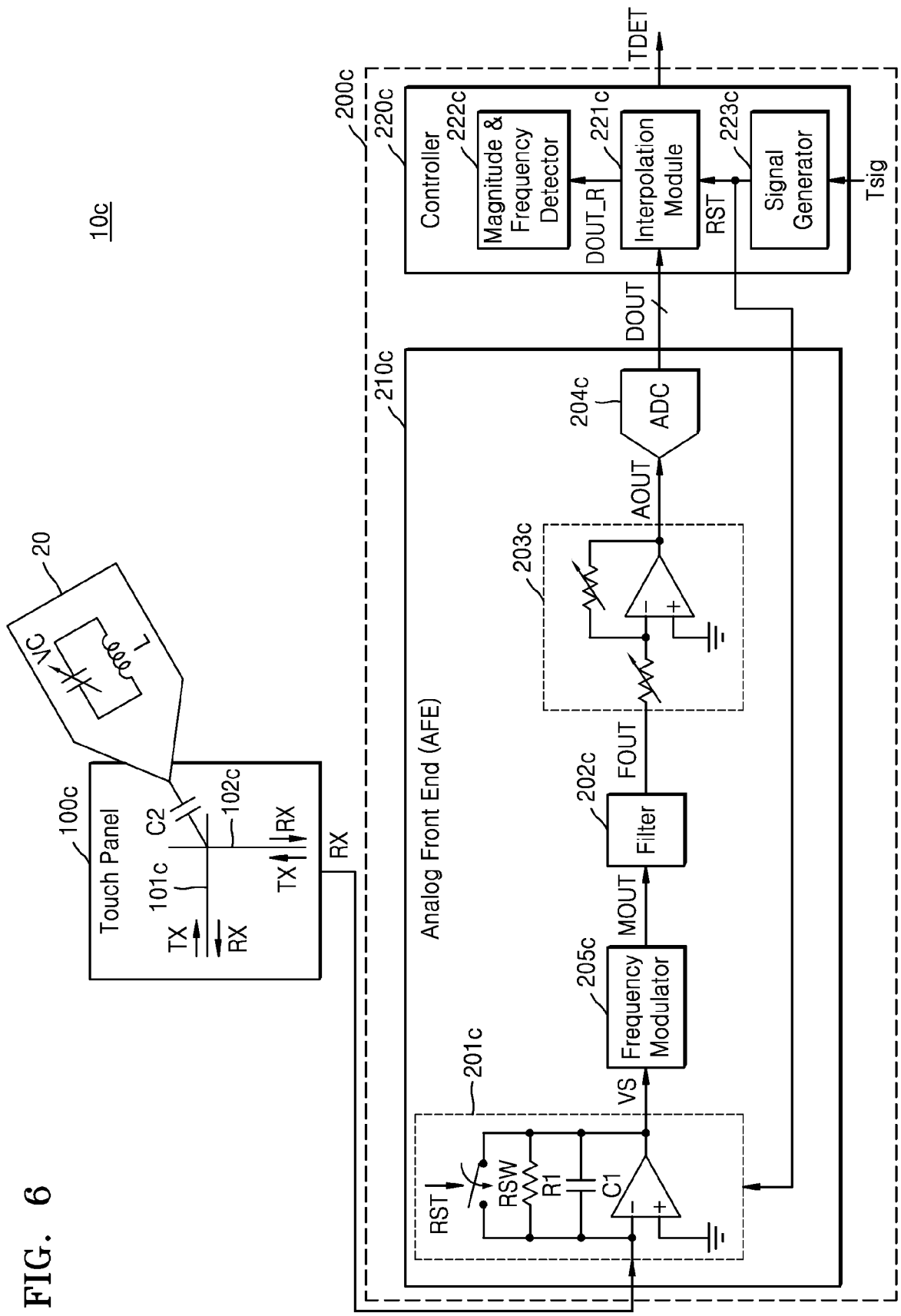
FIG. 6 is a block diagram of another example embodiment of a touch detection device.
Figure 7:
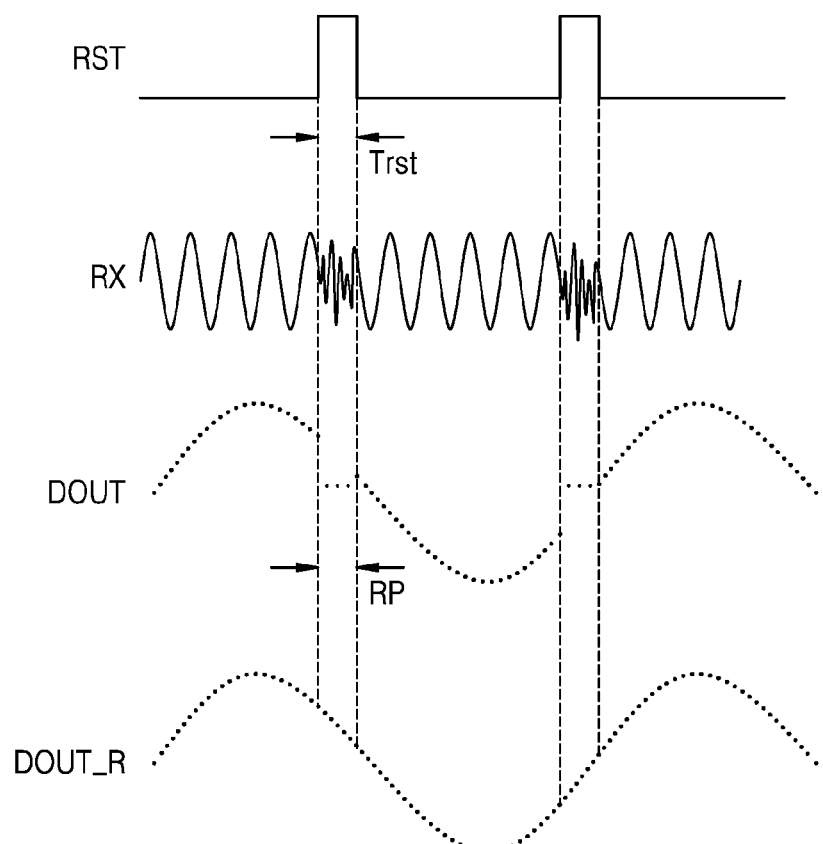
FIG. 7 is a graph showing waveforms of signals of the touch detection device of FIG. 6 in the time domain.

FIG. 6 is a block diagram of an example embodiment of a touch detection device 10c, and FIG. 7 is a graph showing waveforms of signals of touch detection device 10c of FIG. 6 in a time domain.

Similar to touch detection device 10 of FIG. 1, touch detection device 10c of FIG. 6 may include a touch panel 100c, an AFE 210c, and a controller 220b. AFE 210c and controller 220b may constitute a touch detection circuit 200c. As shown in FIG. 6, touch panel 100c may be touched by a pointer 20, e.g., a stylus pen.

Touch panel 100c may provide AFE 210c with a reception signal RX that varies according to the touch of pointer 20. For example, when the pointer 20 is a stylus pen, pointer 20 may include a resonance circuit including a variable capacitor VC and an inductor L and may provide touch panel 100c with a resonance signal generated from the resonance circuit. Pointer 20 may provide touch panel 100c with a self-generated resonance signal or a resonance signal generated based on a transmission signal TX provided through a driving electrode (a first electrode 101b or a second electrode 102b) of touch panel 100c. A sensing electrode (first electrode 101b or second electrode 102b) of touch panel 100c may receive a resonance signal, provided from pointer 20 through a capacitor C2 formed between touch panel 100c and pointer 20, as a touch signal of pointer 20. Accordingly, the reception signal RX may include the touch signal provided from pointer 20.

AFE 210c may generate an output signal DOUT from the reception signal RX. Similar to AFE 210a shown in FIG. 4 and AFE 210b shown in FIG. 5, AFE 210c may include an input buffer 201c, a filter 202c, an amplifier 203c and an ADC 204c and may be reset in response to a reset signal RST. In FIG. 6, circuits in input buffer 201c and amplifier 203c are merely examples for convenience of illustration, and input buffer 201c and amplifier 203c may include circuits different from the circuits shown in FIG. 6.

AFE 210c may further include a frequency modulator 205c. Frequency modulator 205c may down-modulate or downconvert the frequency of a sensing signal VS to thereby generate a frequency-modulated signal MOUT. Frequency modulator 205c may modulate the frequency of the sensing signal VS based on a predetermined modulation frequency or modulate the frequency of the sensing signal VS based on a modulation frequency that is adaptively changed according to the frequency of the reception signal RX.

Although it is shown in FIG. 6 that input buffer 201c may be reset in response to the reset signal RST, the present disclosure is not limited thereto. As described above with reference to FIG. 1, at least one of components of AFE 210c, for example, at least one of input buffer 201c, frequency modulator 205c, filter 202c, and amplifier 203c, may be reset in response to the reset signal RST. Accordingly, AFE 210c may be reset.

Referring to FIG. 7, the frequency of the reception signal RX may be higher than the frequency of the reset signal RST. In other words, the frequency of a touch signal provided from pointer 20, for example, a resonance frequency, may be higher than the frequency of the reset signal RST.

As AFE 210c is reset in the reset period Trst, a touch signal included in the reception signal RX may be removed together with noise. When AFE 210c generates the output signal DOUT based on the sensing signal VS having the same frequency as the reception signal RX, one period of the output signal DOUT is similar to one period of the reception signal RX, and data values of a reset data period RP of the output signal DOUT corresponding to the reset period Trst may be fixed values independent of a touch signal. Therefore, when the frequency of the reception signal RX is higher than the frequency of the reset signal RST, even if controller 220c interpolates the data values of the reset data period RP of the output signal DOUT, it is difficult for the interpolated data values to correctly reflect a touch signal.

However, in AFE 210c according to the embodiment of the present disclosure, frequency modulator 205c may down-modulate or downconvert the frequency of the sensing signal VS to thereby generate the frequency-modulated signal MOUT, and as the frequency-modulated signal MOUT passes through filter 202c, amplifier 203c, and ADC 204c, an output signal DOUT may be generated. Therefore, as shown in FIG. 7, the frequency of the output signal DOUT may be lower than the frequency of the reception signal RX. Accordingly, only data values of a reset data period RP that is significantly less than one period of the output signal DOUT may be fixed values independent of a touch signal. The data values of the reset data period RP may be recovered to data values reflecting a touch signal through the data interpolation of controller 220c.

Referring back to FIG. 6, controller 220c may include an interpolation module 221c, a magnitude and frequency detector 222c, and a signal generator 223c. Interpolation module 221c, magnitude and frequency detector 222c, and signal generator 223c may operate through logic operations or the like and may be implemented in one of hardware, software, and firmware, or a combination of hardware and software.

Signal generator 223c may generate the reset signal RST based on a timing signal Tsig provided from outside of controller 220C, and in some embodiments outside of touch detection circuit 200c. The timing signal Tsig may be a signal indicating a time period in which noise is present, or at a higher level compared to other time periods, or is expected to be present or at a higher level compared to other time periods, in the reception signal RX. Signal generator 223c may generate the reset signal synchronized with the timing signal Tsig based on the timing signal Tsig as described below with reference to FIG. 9.

For example, the timing signal Tsig may be a horizontal synchronizing signal provided from a display driving circuit. The horizontal synchronizing signal has one or more timing pulses which indicate a timing at which the display driving circuit updates pixels of a touch panel with new or updated pixel data. As described below with reference to FIG. 8, display noise may periodically occur every time the pixels of the touch panel are updated, and the display noise may be present in the reception signal RX. As controller 220c generates the reset signal RST based on the timing signal Tsig and AFE 210c is reset in response to the reset signal RST, the influence of the display noise may be minimized.

Interpolation module 221c may apply data interpolation to the output signal DOUT to thereby restore one or more data values of the reset data period RP of the output signal DOUT. Interpolation module 221c may distinguish the reset data period RP of the output signal DOUT based on the reset signal RST provided from signal generator 223c. Interpolation module 221c may interpolate the data value(s) of the reset data period RP based on data values of other periods of the output signal DOUT. Accordingly, interpolation module 221c may generate a reconstructed output signal DOUT_R that includes data values reflecting a touch signal over the entire period.

Magnitude and frequency detector 222c may detect magnitude and frequency information from the reconstructed output signal DOUT_R. For example, magnitude and frequency detector 222c may include a frequency spectral detection circuit such as a Fast Fourier Transform (FFT) circuit or a Discrete time Fourier Transform (DFT) circuit, and may analyze a frequency spectrum of the reconstructed output signal DOUT_R to thereby detect the magnitude and frequency information. Controller 220c may detect the touch coordinates and touch pressure of pointer 20 based on the magnitude and frequency information of the reconstructed output signal DOUT_R. Controller 220c may also change a modulation frequency of frequency modulator 205c based on the frequency information.

Figure 8:
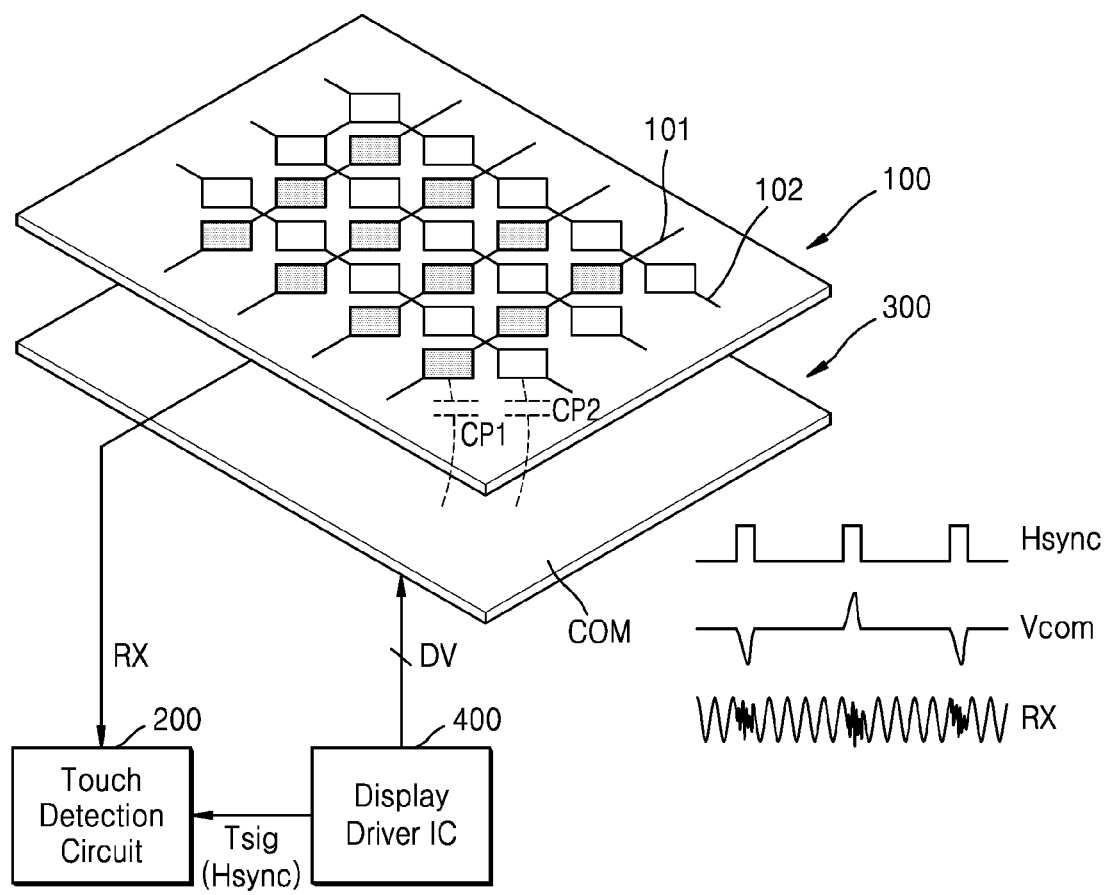
FIG. 8 is a diagram for explaining display noise.

FIG. 8 is a diagram for explaining display noise.

A touch panel 100 may be arranged on a display panel 300, or touch panel 100 may be formed integrally with display panel 300. Therefore, parasitic capacitors CP1 and CP2 may be generated between touch panel 100 and electrode layers of display panel 300. For example, a common electrode COM to which a common voltage Vcom is provided may be formed in the uppermost layer of display panel 300, and the parasitic capacitors CP1 and CP2 may be generated between the common electrode COM and electrodes 101 and 102 of touch panel 100.

A display driving circuit 400 may update display pixels of display panel 300 in response to a horizontal synchronizing signal Hsync. For example, display voltages DV provided to the pixels may be provided to display panel 300 on a line-by-line basis in synchronization with the horizontal synchronizing signal Hsync. Accordingly, noise occurs in the common voltage Vcom commonly provided to the pixels through the common electrode COM. The noise of the common voltage Vcom may be supplied to electrodes 101 and 102 of touch panel 100 through the parasitic capacitors CP1 and CP2 as display noise and may be in a reception signal RX.

In particular, when pointer 20 is a stylus pen as in touch detection device 10c shown in FIG. 6, touch detection device 10c may operate in a state in which a display is turned on, that is, when an image is displayed on display panel 300. Accordingly, the display noise may periodically occur in the reception signal RX at every time period during which the horizontal synchronizing signal Hsync is activated.

To minimize the influence of the display noise, a touch detection circuit 200 (e.g., touch detection circuit 200c of FIG. 6) may receive a timing signal Tsig (e.g., the horizontal synchronizing signal Hsync) indicating update timing of the pixels of display panel 300 from display driving circuit 400, and an AFE (e.g., AFE 210c in FIG. 6) of touch detection circuit 200 may be synchronously reset based on the timing signal Tsig. Thus, the influence of the display noise may be reduced.

FIGS. 9A to 9D are graphs showing example embodiments of timing signals and reset signals.

As described above with reference to FIG. 7, signal generator 223c may generate the reset signal RST based on the timing signal Tsig. In this case, signal generator 223c may generate the reset signal RST in consideration of a delay time until display noise is in the reception signal RX and a time during which the reception signal RX is processed in AFE 210c. Referring to FIGS. 9A to 9D, the reset signal RST is synchronized with the timing signal Tsig, and the cycle of the reset signal RST may be the same as that of the timing signal Tsig.

Figure 9A:
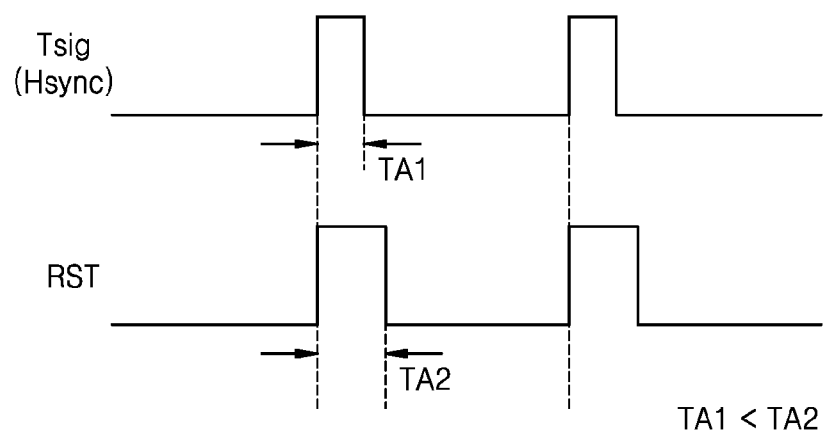
FIGS. 9A, 9B, 9C and 9D are graphs showing example embodiments of timing signals and reset signals.

Referring to FIG. 9A, a timing at which the reset signal RST is changed to an active level, e.g., a logic high, may be the same as a timing at which the timing signal Tsig is changed to the active level. That is, a rising point (or a falling point) of the reset signal RST may be the same as a rising point (or a falling point) of the timing signal Tsig. However, a time period TA2 (hereinafter referred to as an active period TA2 of the reset signal RST), i.e., a reset period, in which the reset signal RST maintains an active level, may be greater than a time period TA1 (hereinafter referred to as an active period TA1 of the timing signal Tsig) in which the timing signal Tsig maintains an active level. In other words, the duty ratio of the reset signal RST may be higher than the duty ratio of the timing signal Tsig.

Figure 9B:
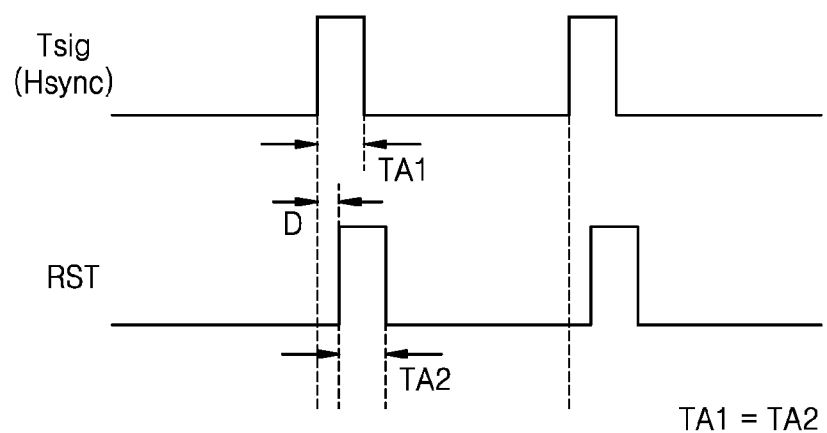

Referring to FIG. 9B, the reset signal RST may be a delayed version of the timing signal Tsig. The reset signal RST may be delayed by a delay amount D greater than the timing signal Tsig. The rising point (or the falling point) of the reset signal RST may be later than the rising point (or the falling point) of the timing signal Tsig. The active period TA2 (i.e., the reset period) of the reset signal RST may be the same as the active period TA1 of the timing signal Tsig. In one embodiment, the delay amount D may be less than the active period TA1 of the timing signal Tsig.

Figure 9C:
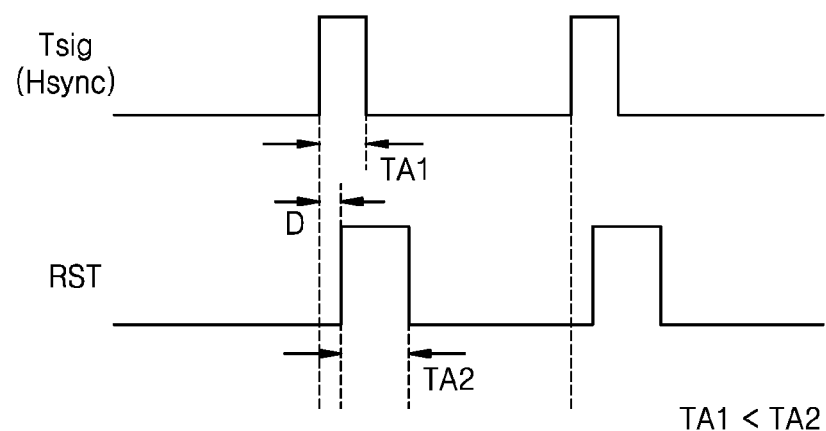

Referring to FIG. 9C, the reset signal RST may be delayed by a delay amount D with respect to than the timing signal Tsig, and the active period TA2 of the reset signal RST may be greater than the active period TA1 of the timing signal Tsig.

Figure 9D:
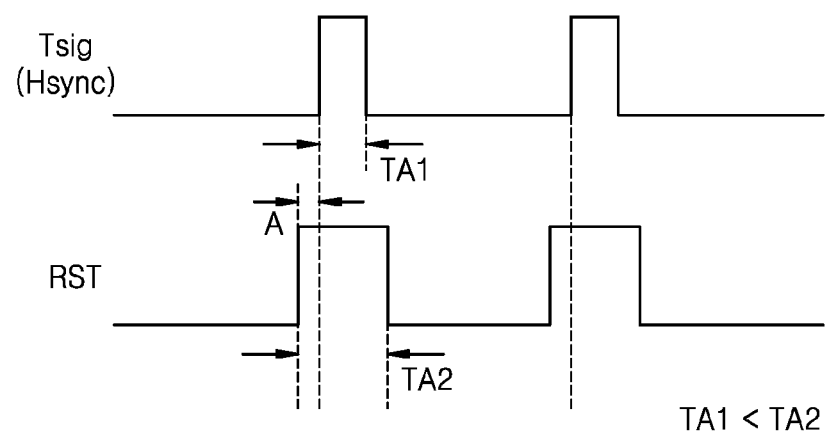

Referring to FIG. 9D, the reset signal RST may be faster than the timing signal Tsig. That is, the reset signal RST may precede the timing signal Tsig by an advanced amount A. The rising point (or the falling point) of the reset signal RST may be faster than the rising point (or the falling point) of the timing signal Tsig. In an embodiment, the advanced amount A may be less than the active period TA1 of the timing signal Tsig. In an embodiment, the active period TA2 of the reset signal RST may be greater than the active period TA1 of the timing signal Tsig. In some embodiments, the timing signal Tsig (e.g., Hsync) may occur with a predetermined or known pattern or frequency, or the time interval between successive active level pulses of the timing signal Tsig (e.g., Hsync) may be determined by touch detection circuit 200 (e.g., touch detection circuit 200c of FIG. 6). This may make it possible for controller 220 (e.g., touch detection circuit 200c of FIG. 6) to cause the rising edge of the active level or pulse of the reset signal RST to occur before the rising edge of the active level of pulse of the timing signal Tsig (Hsync), as shown in FIG. 9D, for example.

Although the reset signal RST generated based on the timing signal Tsig has been described with reference to FIGS. 9A to 9D, these are only example embodiments and the present disclosure is not limited thereto. The reset signal RST may be variously changed within a range in which the reset signal RST is generated based on the timing signal Tsig.

As described with reference to FIG. 1, the controller 220 may determine a period in which noise is in reception signal RX, based on the output signal DOUT, and may generate the reset signal RST. This will be described with reference to FIGS. 10 and 11.

Figure 10:
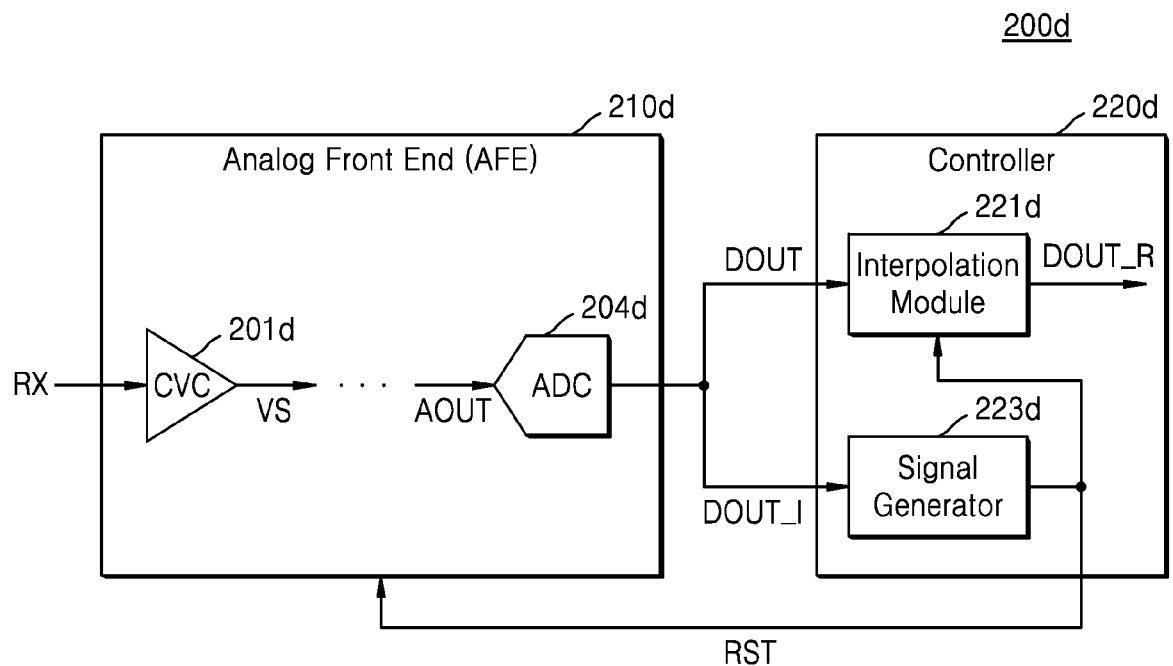
FIG. 10 is a block diagram of an example embodiment of a touch detection circuit.
Figure 11:
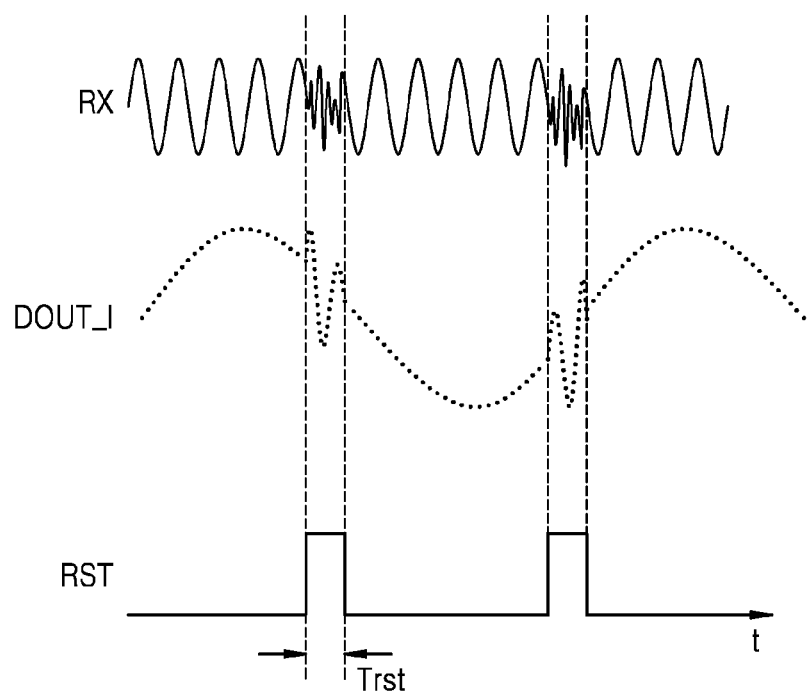
FIG. 11 is a graph illustrating a reset signal generation method of a signal generator in FIG. 10.

FIG. 10 is a block diagram of an example embodiment of a touch detection circuit 200d, and FIG. 11 is a graph illustrating a reset signal generation method of a signal generator 223d in FIG. 10.

Referring to FIG. 10, touch detection circuit 200d may include an AFE 210d and a controller 220d.

AFE 210d may generate an output signal DOUT based on a reception signal RX and may include an input buffer 201d and an ADC 204d. AFE 210d may further include other components. For example, AFE 210d may further include a filter, a gain amplifier, a frequency modulator, and the like described above with reference to FIGS. 1, 4, 5, and 6.

Controller 220d may control AFE 210d and may detect touch coordinates and touch pressure based on an output signal DOUT of AFE 210d. Controller 220d may include an interpolation module 221d and signal generator 223d. Although not shown in FIG. 10, controller 220d may further include a magnitude and frequency detector. Signal generator 223d may generate a reset signal RST and provide the reset signal RST to AFE 210d. AFE 210d may be periodically reset in response to the reset signal RST, and interpolation module 221d may perform data interpolation on the output signal DOUT provided from AFE 210d, which is periodically reset, to thereby generate a reconstructed output signal DOUT_R.

Signal generator 223d may generate the reset signal RST based on an initial signal of the output signal DOUT provided from AFE 210d, for example, an initial output signal DOUT_I. The initial output signal DOUT_I denotes an output signal DOUT output from AFE 210d in an operation before touch detection circuit 200d performs touch detection, for example, a setting operation, a test operation, or an initialization operation.

Referring to FIG. 11, data values of the initial output signal DOUT_I may reflect noise of the reception signal RX. Signal generator 223d may determine a period in which noise occurs, based on the initial output signal DOUT_I, and may generate a reset signal RST based on a result of the determination. In an embodiment, signal generator 223d may determine periods in which abnormal data values are detected in the initial output signal DOUT_I, and may provide a reset signal RST having an active level periodically, based on a cycle and duration of the periods in which the abnormal data values are detected.

Figure 12:
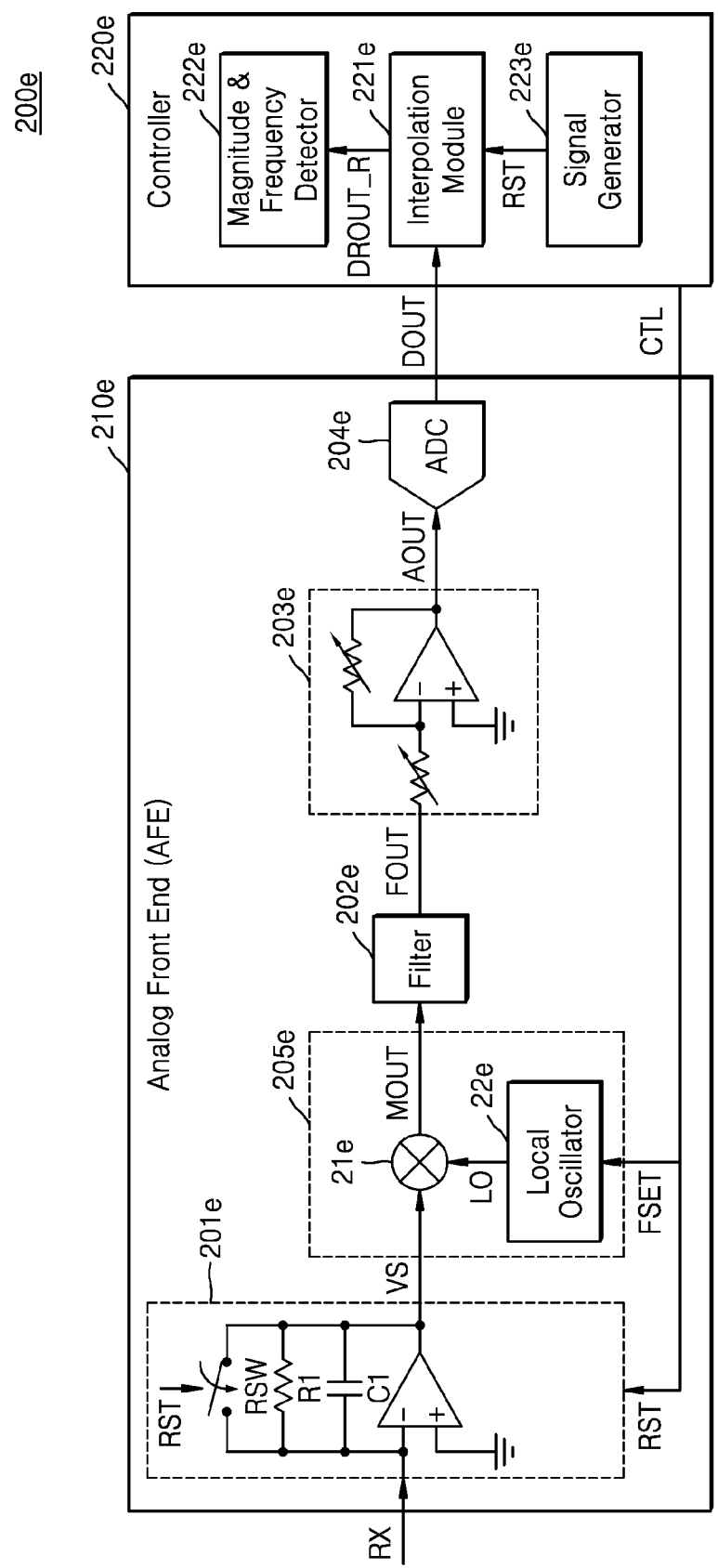
FIG. 12 is a block diagram of another example embodiment of a touch detection circuit.
Figure 13A:
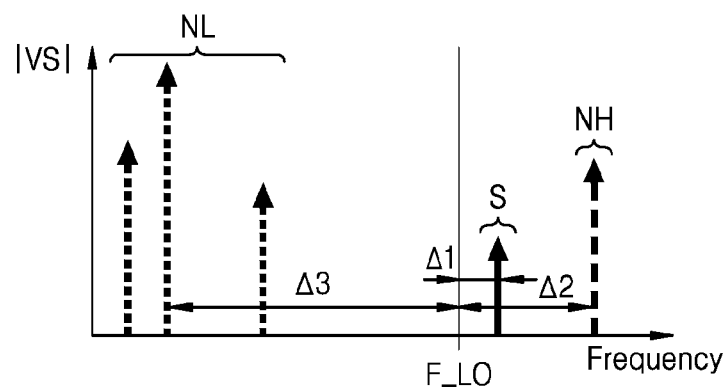
FIGS. 13A, 13B and 13C are graphs showing internal signals of an AFE of FIG. 12 in the frequency domain.
Figure 13B:
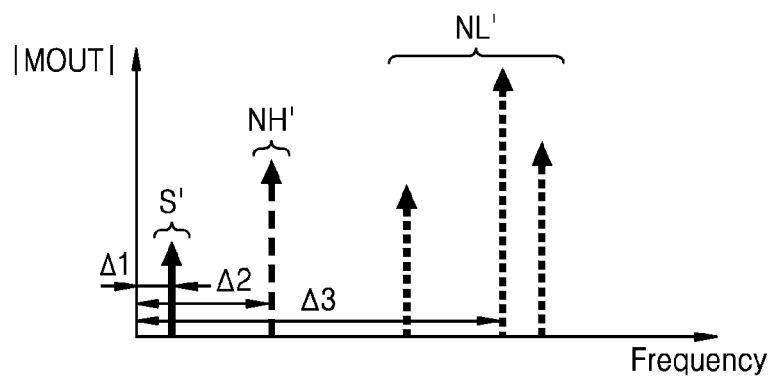
Figure 13C:
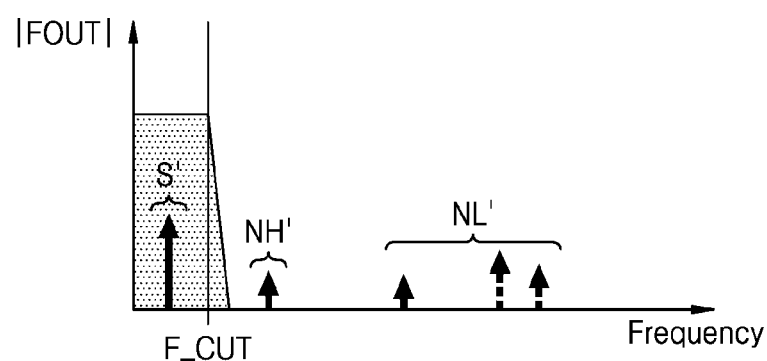

FIG. 12 is a block diagram of an example embodiment of a touch detection circuit 200e, and FIGS. 13A to 13C are graphs showing internal signals of an AFE 210e of FIG. 12 in a frequency domain.

Touch detection circuit 200e may include AFE 210e and a controller 220e. AFE 210e may include an input buffer 201e, a frequency modulator 205e, a filter 202e, an amplifier 203e, and an ADC 204e, and controller 220e may include an interpolation module 221e, a magnitude and frequency detector 222e, and a signal processor 223e. The configuration and operation of touch detection circuit 200e is similar to those of touch detection circuit 200c of FIG. 6. Therefore, a redundant description will be omitted.

Referring to FIG. 12, frequency modulator 205e may include a mixer 21e and a local oscillator 22e and may adaptively change a modulation frequency.

Mixer 21e may output a frequency-modulated signal MOUT by heterodyning a sensing signal VS and a local oscillator signal LO provided from input buffer 201e. Mixer 21e may shift the frequency of the sensing signal VS according to the frequency of the local oscillator signal LO, that is, a modulation frequency (or a shift frequency).

Local oscillator 22e may provide the local oscillator signal LO to mixer 21e and may change the frequency of the local oscillator signal LO in response to a frequency setting signal FSET provided from controller 220e, that is, the modulation frequency. For example, local oscillator 22e may include a Phase Locked Loop (PLL) or a Delay Locked Loop (DLL).

The frequency of the local oscillator signal LO may be set based on the frequency of a touch signal and the set pass band of filter 202e. Accordingly, mixer 21e heterodynes the frequency bands of the sensing signal VS based on the frequency of the local oscillator signal LO to thereby shift a frequency band by a pointer included in sensing signal VS 202e to the set pass band of filter 202e.

FIGS. 13A, 13B, and 13C illustrate the sensing signal VS, the frequency-modulated signal MOUT, and a filter output signal FOUT in a frequency domain, respectively.

Referring to FIG. 13A, the sensing signal VS generated from a reception signal RX may include low and high frequency bands NL and NH caused by noise in addition to a frequency band S caused by a touch signal. That is, the sensing signal VS may include the high frequency band NH caused by noise of a higher frequency than that of the frequency band S caused by a touch signal as well as the low frequency band NL caused by noise of a lower frequency than that of the frequency band S caused by a touch signal.

Frequency modulator 205e may heterodyne the sensing signal VS and the local oscillator signal LO so that filter 202e easily removes a frequency band caused by noise and easily extracts the frequency band S caused by a touch signal.

The local oscillator signal LO may have a frequency F_LO close to the frequency band S caused by a touch signal. By heterodyning based on the frequency F_LO of the local oscillator signal LO, the frequency band S caused by a touch signal may be shifted to be spaced apart from the low and high frequency bands NL and NH caused by noise, for example in a lower frequency range than the ranges to which NL and NH are shifted.

As shown in FIG. 13B, the low frequency band NL of the sensing signal VS, the frequency band S caused by a touch signal, and the high frequency band NH of the sensing signal VS, shown in FIG. 13A, may be respectively shifted to frequency bands NL', S', and NH' corresponding to differences $\Delta 1$, $\Delta 2$, and $\Delta 3$ from the frequency F_LO of the local oscillator signal LO. Accordingly, the frequency bands NL' and NH' caused by noise may be located at one side of the frequency band S' caused by a touch signal.

Referring to FIG. 13C, the frequency band S' of FIG. 13B may be extracted by filter 202e (e.g., a low pass filter) having a cutoff frequency F_CUT. That is, as the frequency-modulated signal MOUT of FIG. 13B passes through filter 202e having the cutoff frequency F_CUT, the frequency band S' caused by a touch signal is located in a set pass band of filter 202e and thus is output through filter 202e. However, the frequency bands NL' and NH' caused by noise are located in a stop band of filter 202e and thus may not pass through filter 202e. Accordingly, as shown in FIG. 13C, the frequency bands NU and NH' caused by noise in the filter output signal FOUT may be attenuated.

Controller 220e may generate a frequency setting signal FSET for setting a modulation frequency, i.e., the frequency F_LO of the local oscillator signal LO, and provide the frequency setting signal FSET to frequency modulator 205e, so that a frequency band caused by a touch signal is included in the set pass band of filter 202e and a frequency band caused by noise is included in the stop band of filter 202e.

As shown in FIG. 13B, a frequency offset $\Delta 1$, that is, a difference between the frequency band S caused by a touch signal and the frequency F_LO of the local oscillator signal LO, may be set such that the difference is included in the set pass band of filter 202e, and the frequency F_LO of the local oscillator signal LO may be varied according to the frequency band S caused by a local oscillator signal LO. Since the frequency offset $\Delta 1$ is determined by the cutoff frequency F_CUT of filter 202e, the frequency offset $\Delta 1$ may have a constant value.

In an embodiment, touch detection circuit 200e may operate in a coarse mode and a fine mode. Controller 220e may coarsely detect a touch in the coarse mode and may finely detect the touch in the fine mode based on a detection result. In the coarse mode, controller 220e may set the frequency F_LO of the local oscillator signal LO, that is, the modulation frequency, based on a predicted frequency of a touch signal (e.g., the frequency of a transmission signal) and the frequency offset Δ1. As described above, controller 220e may detect the magnitude and frequency of a touch signal based on the reconstructed output signal DOUT_R. In the fine mode, controller 220e may set the frequency F_LO of the local oscillator signal LO based on the frequency of a touch signal detected in the coarse mode and the frequency offset Δl. Accordingly, the modulation frequency may be adaptively changed, and the noise removing performance of frequency modulator 205e and filter 202e may be improved. In the fine mode, controller 220e may detect the magnitude and frequency of a touch signal based on the reconstructed output signal DOUT_R, and may detect touch coordinates and pressure based on the magnitude and frequency of the touch signal.

Figure 14A:
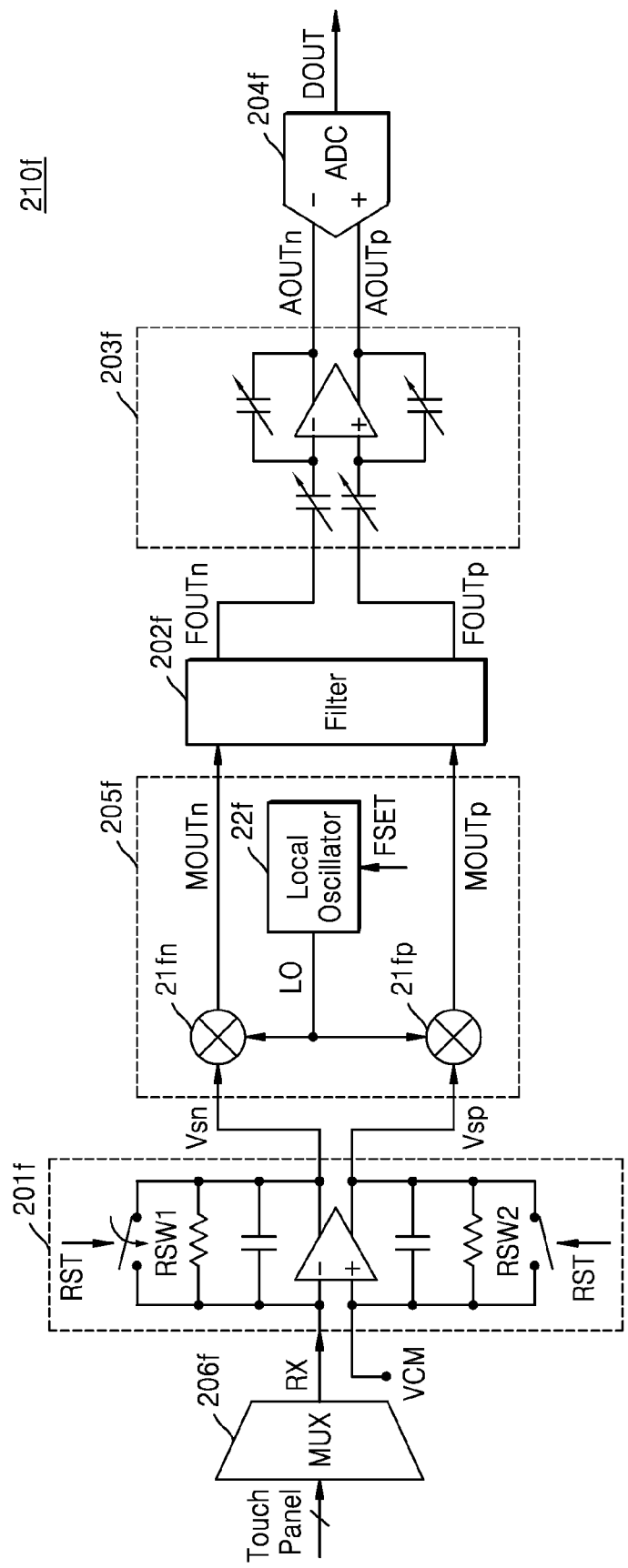
FIGS. 14A and 14B are circuit diagrams of more example embodiments of AFEs.
Figure 14B:
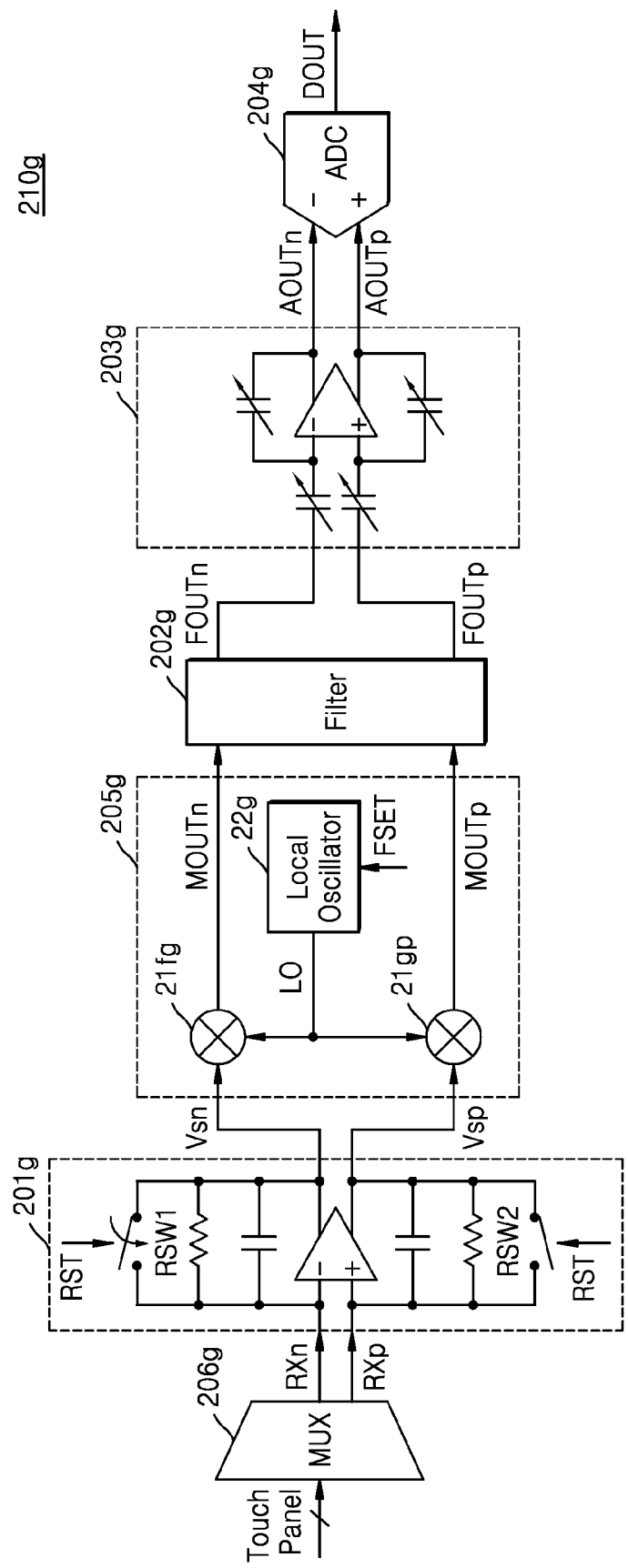

FIGS. 14A and 14B are circuit diagrams of example embodiments of AFEs 210f and 210g.

FIGS. 14A and 14B illustrate embodiments for processing a reception signal RX in a differential mode.

Referring to FIG. 14A, AFE 210f may include an input buffer 201f, a frequency modulator 205f, a filter 202f, an amplifier 203f, and an ADC 204f, similar to AFE 210e of FIG. 12.

AFE 210f may further include a selector 206f. Selector 206f may select a corresponding reception signal RX among reception signals received from a touch panel and provide the selected reception signal RX to input buffer 201f. Selector 206f may be implemented with a multiplexer, switch circuits, or the like.

Input buffer 201f may receive the reception signal RX and a common mode voltage VCM and may output sensing signals VSn and VSp that are differential signals. input buffer 201f may include reset switches RSW1 and RSW2 connected to input terminals and output terminals, and the reset switches RSW1 and RSW2 may be turned on in response to a reset signal RST provided from a controller (e.g., controller 220e of FIG. 12) to thereby reset input buffer 201f.

Frequency modulator 205f may output frequency-modulated signals MOUTn and MOUTp by heterodyning the sensing signals VSn and VSp based on a local oscillator signal LO provided from a local oscillator 22f. The frequency of the local oscillator signal LO, that is, a modulation frequency, may be set by a frequency setting signal FSET provided from the controller.

Filter 202f may output filter output signals FOUTn and FOUTp, which are differential signals, by filtering the frequency-modulated signals MOUTn and MOUTp with the same cutoff frequency as each other.

Amplifier 203f may include a differential amplifier and may output analog output signals A_OUTn and A_OUTp, which are differential signals, by amplifying the filter output signals F_OUTn and F_OUTp.

Referring to FIG. 14B, AFE 210g may include an input buffer 201f, a filter 202f, an amplifier 203f, an ADC 204f, a frequency modulator 205f, and a selector 206f.

Selector 206f may differentially provide input buffer 201f with two reception signals RXn and RXp provided from two adjacent sensing electrodes among reception signals received from a touch panel. Input buffer 201f may generate two differential sensing signals VSn and VSp by converting the two reception signals RXn and RXp. As described with reference to FIG. 14A, frequency modulator 205f, filter 202f, amplifier 203f, and ADC 204f may process the two differential sensing signals VSn and VSp in a differential mode to thereby generate an output signal DOUT.

Figure 15:
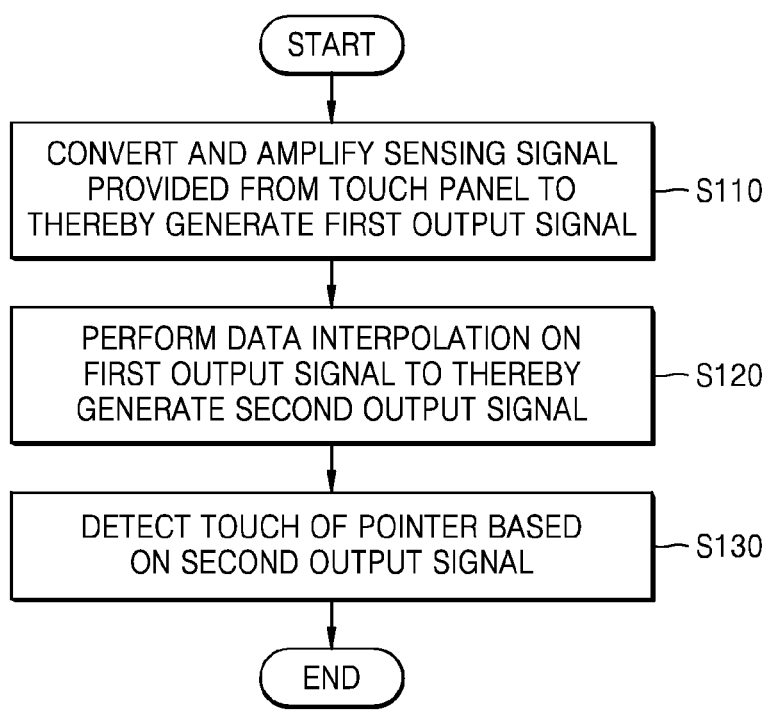
FIG. 15 is a flowchart of an example embodiment of a touch detection method.

FIG. 15 is a flowchart of an example embodiment of a touch detection method.

The touch detection method of FIG. 15 is a method of detecting a touch of a pointer which occurs in a touch panel, and may be performed in the above-described touch detection circuit (e.g., touch detection circuit 200 of FIG. 1, touch detection circuit 200c of FIG. 6, touch detection circuit 200d of FIG. 10, or touch detection circuit 200e of FIG. 12). Hereinafter, the touch detection method of FIG. 15 will be described with reference to FIG. 1.

Referring to FIG. 15, AFE 210 may generate a first output signal including digital data values, that is, an output signal DOUT, based on a reception signal RX provided from touch panel 100 (Operation S110). For example, AFE 210 may convert the reception signal RX, which is an alternate current (AC) signal, into a sensing signal VS, amplify the gain of the sensing signal VS, and convert a signal having the amplified gain to digital data values. AFE 210 may filter the sensing signal VS to thereby remove noise and may down-convert the frequency of the sensing signal VS.

AFE 210 may be periodically reset in response to a reset signal RST. At least one of components of AFE 210, for example, input buffer 201, filter 202, and amplifier 203, may be reset in response to reset signal RST. Therefore, at least one of an operation in which input buffer 201 converts the reception signal RX into the sensing signal VS, an operation in which filter 202 performs filtering on the sensing signal VS (or a frequency-modulated signal), and an operation in which amplifier 203 amplifies the gain of an input signal may include a period in which a periodic reset is performed.

The reset signal RST may have an active level in a period in which noise is in the reception signal RX. Noise may be avoided as AFE 210 is reset in response to the reset signal RST. In an embodiment, the reset signal RST may be a signal synchronized with a timing signal provided from a display driving circuit, for example, a horizontal synchronizing signal.

Controller 220 may perform data interpolation on the first output signal to thereby generate a second output signal, i.e., a reconstructed output signal DOUT_R (Operation S120).

As described above, when AFE 210 is periodically reset, data values of a reset data period of the output signal DOUT corresponding to a reset period of the reset signal RST are independent of the reception signal RX and do not reflect a touch signal. Even if AFE 210 is not periodically reset, there may be a noise data period periodically in the output signal DOUT, and data values of the noise data period do not properly reflect a touch signal.

Controller 220 may perform data interpolation to restore data values of the reset data period (or the noise data period) of the first output signal, i.e., the output signal DOUT, to data values that reflect a touch signal. Controller 220 may generate data values of the reset data period by interpolating data values of points adjacent to the reset data period among data values of a period other than the reset data period of the first output signal. Accordingly, a second output signal including data values that accurately reflect a touch signal may be generated.

Controller 220 may detect a touch of a pointer based on the second output signal, i.e., the reconstructed output signal DOUT_R (Operation S130). For example, controller 220 may detect the magnitude of the second output signal and calculate touch coordinates based on the magnitude. Controller 220 may also detect the frequency of the second output signal and detect touch pressure based on the frequency.

Figure 16:
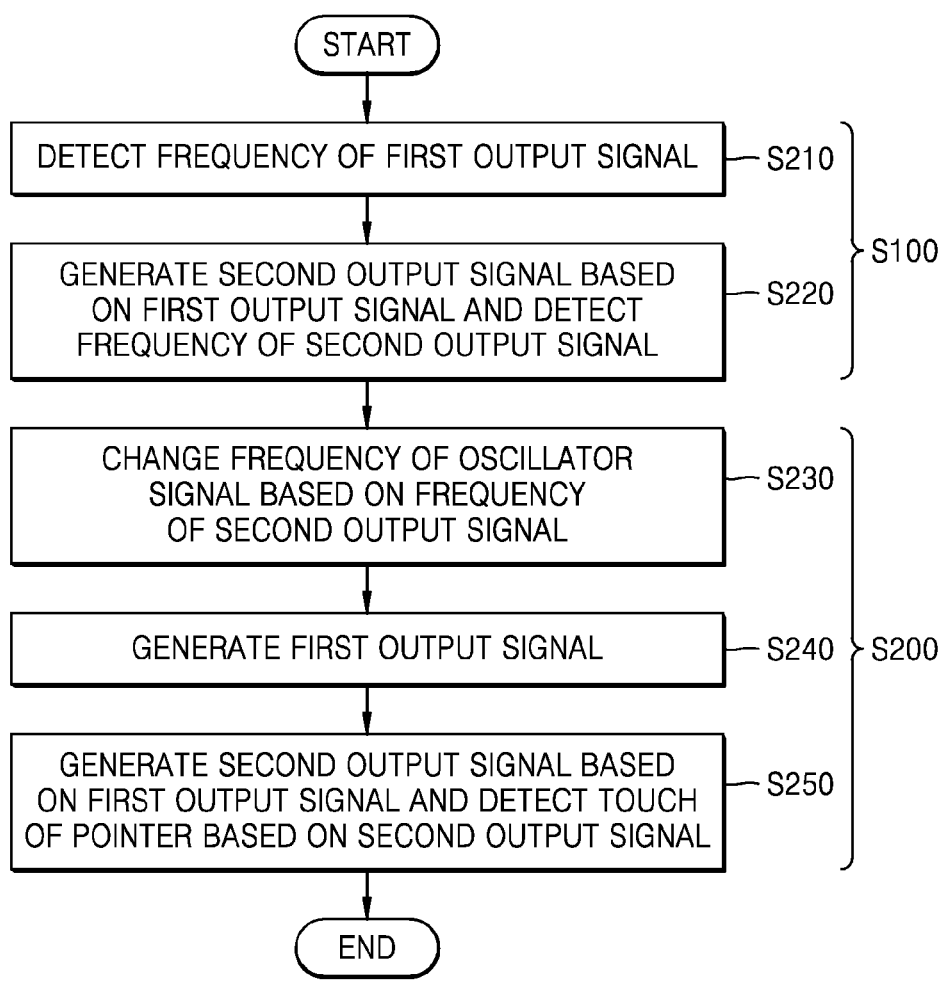
FIG. 16 is a flowchart of another example embodiment of a touch detection method.

FIG. 16 is a flowchart of an example embodiment of a touch detection method.

The touch detection method of FIG. 16 is a method of detecting a touch of a pointer which occurs in a touch panel, and may be performed in the touch detection circuit 200e of FIG. 12. Hereinafter, the touch detection method of FIG. 16 will be described with reference to FIG. 12.

Touch detection circuit 200e may perform fine sensing (Operation S200) after performing coarse sensing (Operation S100). Touch detection circuit 200e may roughly detect touch information by performing the coarse sensing and accurately detect a touch by performing the fine sensing based on the roughly detected touch information.

Referring to FIG. 16, in the coarse sensing, AFE 210e may generate a first output signal according to coarse sensing, that is, an output signal DOUT (Operation S210). AFE 210e may generate the first output signal according to Operation S110 of FIG. 15 described above. In this case, in an operation of down-converting the frequency of the sensing signal VS, the sensing signal VS may be heterodyned based on the local oscillator signal LO provided from local oscillator 22e, and the frequency F_LO (i.e., the modulation frequency) of the local oscillator signal LO may be roughly set based on a frequency offset set based on the cutoff frequency of filter 202e and a predicted frequency of the first output signal.

Controller 220e may generate a second output signal, i.e., a reconstructed output signal DOUT_R, based on the first output signal of AFE 210e and may detect the frequency of the second output signal (Operation S220). Controller 220e may perform data interpolation on the first output signal to thereby generate the second output signal. The first output signal may have periodic data values independent of a data signal, and controller 220e may restore the data values to data values associated with a touch signal via data interpolation to thereby generate the second output signal, i.e., the reconstructed output signal DOUT_R. The frequency of the second output signal may reflect the frequency of the touch signal.

In the fine sensing, controller 220e may change the frequency of the local oscillator signal LO, that is, a modulation frequency, based on the detected frequency (Operation S230). Controller 220e may reset the modulation frequency based on the frequency offset and the detected frequency.

AFE 210e may generate a first output signal according to fine sensing (Operation S240). AFE 210e may regenerate the first output signal according to Operation S110 of FIG. 15 described above. In an operation of down-converting the frequency of the sensing signal VS, AFE 210e may heterodyne the sensing signal VS based on the local oscillator signal LO having a changed frequency.

Controller 220e may generate a second output signal based on the first output signal of AFE 210e and detect a touch of a pointer based on the second output signal (Operation S250). AFE 210e may perform data interpolation on the first output signal to thereby generate a second output signal, i.e., a reconstructed output signal. Controller 220e may calculate the touch coordinates and touch pressure of a pointer based on the magnitude and frequency of the second output signal.

Figure 17:
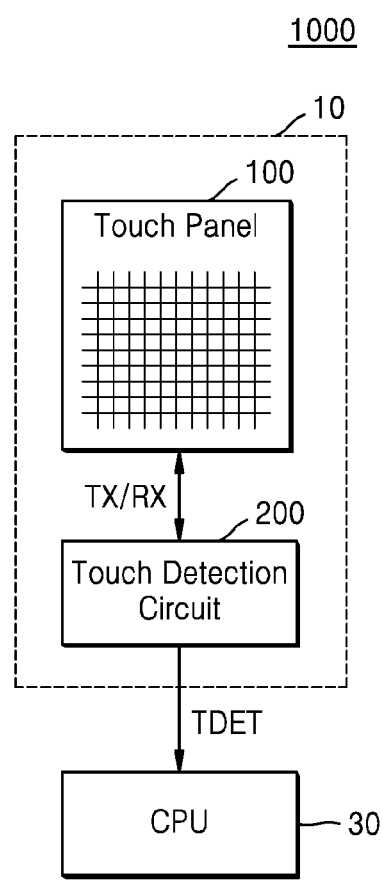
FIG. 17 is a block diagram of a system including an example embodiment of a touch detection device.

FIG. 17 is a block diagram of an example embodiment of a system 1000 including a touch detection device.

System 1000 may be a computing system such as a personal computer, a network server, a tablet PC, an e-reader, a PDA, a PMP, a mobile phone, a smart phone, or a wearable device, or may be a control system for controlling an automobile, a mechanical device, a manufacturing facility, a door, or the like. As shown in FIG. 17, system 1000 may include a touch detection device 10 and a central processing unit (CPU) 30. System 1000 may further include other components such as a sensor module and a display device.

CPU 30 may control the overall operation of system 1000. For example, CPU 30 may control the operation of system 1000 by executing a series of instructions stored in a memory. CPU 30 may recognize a touch position and touch pressure based on a touch detection signal TDET received from touch detection device 10 and control operations of the other components of system 1000 based on the touch position and the touch pressure. For example, CPU 30 may display an image on a display device and may display an image change according to a touch position and touch pressure on a display device.

Touch detection device 10 may include a touch panel 100 and a touch detection circuit 200. Touch detection circuit 200 may provide a transmission signal TX to touch panel 100 and may receive a reception signal RX from touch panel 100. Touch detection circuit 200 may include an AFE and a controller. As described above with reference to FIG. 1 and the like, the AFE may be periodically reset and the controller may generate a reconstructed output signal by restoring a data value of a reset period of an output signal through data interpolation. The controller may detect touch coordinates and touch pressure based on the reconstructed output signal and may provide the touch coordinates and touch pressure to CPU 30 as the touch detection signal TDET.

Figure 18:
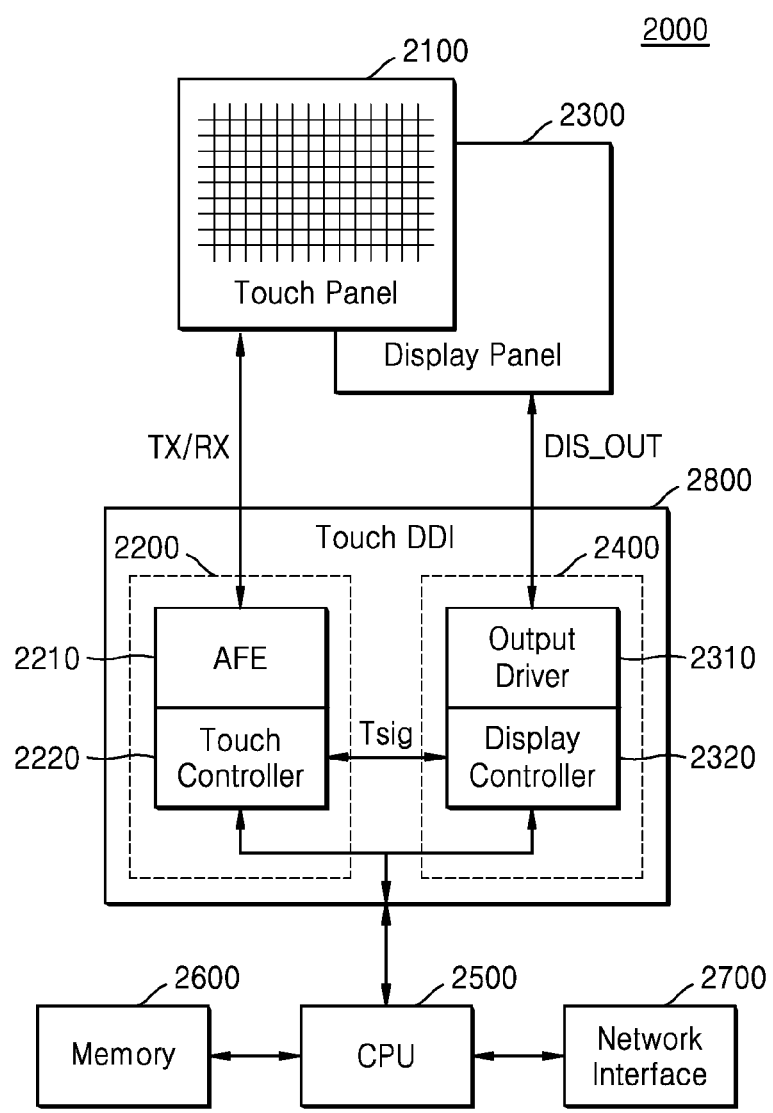
FIG. 18 is a block diagram of an example embodiment of a system.

FIG. 18 is a block diagram of an example embodiment of a system 2000.

As shown in FIG. 18, system 2000 may include a CPU 2500, a memory 2600, a network interface 2700, a touch panel 2100, a display panel 2300, and a touch display driver integrated circuit (DDI) 2800. Unlike the case shown in FIG. 18, CPU 2500 and the other components of system 2000 may be connected to each other via a bus and communicate with each other.

CPU 2500 may control the overall operation of system 2000 by executing instructions stored in memory 2600 or a memory included in CPU 2500. For example, CPU 2500 may provide image data to a touch display driving circuit 2400, recognize an external input by interpreting a touch of a pointer to an image output to display panel 2300, and perform at least one predetermined function in response to the external input. In an embodiment, CPU 2500 may be a system-on-chip (SoC) that includes a processor, a bus, and a functional block, and may be referred to as an application processor (AP).

Memory 2600 may be accessed by CPU 2500, and may include a non-volatile memory such as electrically erasable programmable read-only memory (EEPROM), a flash memory, phase change random access memory (PRAM), resistance random access memory (RRAM), nano floating gate memory (NFGM), polymer random access memory (PoRAM), magnetic random access memory (MRAM), or ferroelectric random access memory (FRAM), or may include a volatile memory such as dynamic random access memory (DRAM), static random access memory (SRAM), mobile DRAM, double data rate synchronous dynamic random access memory (DDR SDRAM), low power DDR (LPDDR) SDRAM, graphic DDR (GDDR) SDRAM, or Rambus dynamic random access memory (RDRAM).

Network interface 2700 may provide CPU 2500 with an interface to a network outside system 2000. For example, network interface 2700 may connect to a wired or wireless network, and may deliver signals received from a network to CPU 2500, or transmit signals received from CPU 2500 to the network.

Touch DDI 2800 may be implemented as a single chip and may include a touch detection circuit 2200 for controlling touch panel 2100 and touch display driving circuit 2400 for controlling display panel 2300. Touch detection circuit 2200 may include an AFE 2210 and a touch controller 2220 and touch display driving circuit 2400 may include an output driver 2310 and a display controller 2320. Touch panel 2100 may be arranged on display panel 2300. Touch panel 2100 may be formed integrally with display panel 2300. Touch panel 2100 may transmit the output of display panel 2300, and touch panel 2100 and display panel 2300 may be collectively referred to as a touch screen.

AFE 2210 may provide a transmission signal TX to touch panel 2100 and may receive a reception signal RX from touch panel 2100. AFE 2210 may convert and amplify the reception signal RX to thereby generate an output signal, and touch controller 2220 may detect touch information of a pointer based on the output signal. AFE 2210 may be periodically reset in response to a reset signal provided from touch controller 2220, and accordingly the output signal may have periodic data values independent of a touch signal in a reset period. Touch controller 2220 may generate a reconstructed output signal by performing data interpolation on the output signal and restoring one or more data values of a reset period of the output signal. The controller may detect touch information based on the reconstructed output signal and provide a signal including the touch information to CPU 2500.

Display controller 2320 may convert image data provided by CPU 2500 into a signal for display on display panel 2300, and output driver 2310 may output a display output signal DIS_OUT under the control of display controller 2320. As shown in FIG. 18, display controller 2320 may communicate with touch controller 2220. For example, display controller 2320 may provide touch controller 2220 with a timing signal Tsig including information about display timing. For example, the timing signal Tsig may be a horizontal synchronizing signal indicating the update timing of pixels of display panel 2300. Touch controller 2220 may provide display controller 2320 with a signal including information about an operation mode, for example, information about whether or not to enter a standby mode.

Although not shown in FIG. 18, touch DDI 2800 may include a memory that is accessed by touch controller 2220 and/or display controller 2320, and may also include a power supply circuit for supplying power to AFE 2210 and output driver 2310. Unlike the case shown in FIG. 18, touch controller 2220 and display controller 2320 may communicate with CPU 2500 through separate interfaces (e.g., LoSSI and I2C).

While the inventive concept has been particularly shown and described with reference to embodiments thereof, it will be understood that various changes in form and details may be made therein without departing from the spirit and scope of the following claims.

What is claimed is:

1. A touch detection device, comprising:
    a current-to-voltage converter configured to convert a reception signal received from a touch panel into a sensing signal, and further configured to be periodically reset for a reset time period in response to a reset signal;
    a frequency modulator configured to generate a frequency-modulated signal by downconverting a frequency of the sensing signal;
    a filter configured to output as a filter output signal a low frequency band of the frequency-modulated signal based on a set pass band;
    an amplifier configured to generate an analog signal by amplifying, with a set gain, the filter output signal;
    an analog-to-digital converter configured to convert the analog signal into a first digital output signal comprising a time-series of data values, including: a plurality of first data values corresponding to a first time period immediately prior to the reset time period, at least one second data value corresponding to the reset time period, and a plurality of third data values corresponding to a third time period immediately subsequent to the reset time period; and
    a controller configured to generate a second digital output signal based on the first digital output signal by performing data interpolation on the at least one second data value of the first digital output signal corresponding to the reset time period by interpolating between least one of the first data values of the first time period and at least one of the third data values of the third time period.

2. The touch detection device of claim 1, wherein the current-to-voltage converter is configured to output a voltage having a level independent of the reception signal for the reset time period, in response to the reset signal.

3. The touch detection device of claim 1, wherein the frequency modulator is configured to generate the frequency-modulated signal by heterodyning a frequency of the sensing signal based on a set modulation frequency,
    wherein the controller is configured to detect a frequency of the second digital output signal and is further configured to change a modulation frequency of the frequency modulator based on the frequency of the second digital output signal and the set pass band.

4. The touch detection device of claim 1, wherein the amplifier is configured to be periodically reset for the reset time period in response to the reset signal.

5. The touch detection device of claim 1, wherein the controller is configured to generate the reset signal based on a timing signal provided from a display driving circuit that drives a display panel adjacent to the touch panel.

6. The touch detection device of claim 5, wherein the timing signal comprises a horizontal synchronizing signal indicating a timing at which the display driving circuit updates pixels of the display panel with new pixel data.

7. The touch detection device of claim 5, wherein the reset signal has an active period which is earlier or later than an active period of the timing signal.

8. The touch detection device of claim 1, wherein the controller is configured to analyze a noise component of the first digital output signal to thereby determine a period in which noise is in the reception signal and is further configured to generate the reset signal having an active level in the period in which the noise is in the reception signal.

9. The touch detection device of claim 1, wherein the controller is configured to detect a magnitude and frequency of the second digital output signal and is further configured to detect touch coordinates and touch pressure generated on the touch panel based on the magnitude and frequency of the second digital output signal.

10. The touch detection device of claim 1, wherein the controller is configured to perform the data interpolation between: (1) one of the first data values corresponding to a first point in time which immediately precedes the reset time period of the first digital output signal; and (2) one of the third data values which immediately follows the reset time period of the first digital output signal.

11. A touch detection device for processing a reception signal that varies with a touch of a pointer on a touch panel, the touch detection device comprising:
an analog front end configured to generate a first output signal by converting and amplifying the reception signal, wherein the analog front end is periodically reset in response to a reset signal during a reset time period to generate the first output signal having non-continuous data values during the reset time period; and
a controller configured to generate a second output signal having continuous data values by interpolating the non-continuous data values in the reset time period of the first output signal between a first data value of a first continuous time period of the first output signal, preceding the reset time period, and a second data value of a second continuous time period of the first output signal, subsequent to the reset time period, and further configured to detect a frequency of the second output signal,
wherein the analog front end comprises:
an input buffer configured to convert the reception signal into a sensing signal;
a frequency modulator configured to generate a frequency-modulated signal by downconverting a frequency of the sensing signal;
a filter configured to filter a frequency component of the frequency-modulated signal based on a set pass band and to output a filter output signal; and
an amplifier configured to generate an analog output signal by amplifying the filter output signal,
wherein at least one of the input buffer, the frequency modulator, the filter, and the amplifier is reset in response to the reset signal.

12. The touch detection device of claim 11, wherein the controller is configured to generate the reset signal based on a timing signal indicating a timing for updating pixels of a display panel adjacent to the touch panel in units of lines.

13. The touch detection device of claim 11, wherein a frequency of the reception signal varies with touch pressure of the pointer, and the controller is configured to calculate the touch pressure of the pointer based on the frequency of the second output signal.

14. A method of detecting a touch by processing a reception signal that varies with a touch of a pointer on a touch panel, the method comprising:
generating an output signal, based on the reception signal, wherein the output signal has data values corresponding to a variation of the reception signal;
generating a reconstructed output signal by interpolating at least one second data value of a second period of the output signal, between a first data value of a first period of the output signal which precedes the second period, and a third data value of a third period of the output signal which follows the second period; and
detecting a magnitude and frequency of the reconstructed output signal,
wherein the generating of the output signal comprises:
converting the reception signal into a sensing signal;
generating a low frequency signal by down-modulating a frequency of the sensing signal;
filtering noise of the low frequency signal to output a noise-filtered low frequency signal;
generating an analog signal by amplifying the noise-filtered low frequency signal; and
generating the output signal by converting the analog signal into a digital signal.

15. The method of claim 14, wherein the generating of the output signal comprises processing by an analog front end the reception signal to thereby generate the output signal, wherein the analog front end stops an operation during a reset period in response to a reset signal to thereby generate the output signal having non-continuous data values in the second period corresponding to the reset period.

16. The method of claim 15, wherein the reset signal is generated based on a horizontal synchronizing signal indicating a timing for updating pixels of a display panel adjacent to the touch panel.

17. The method of claim 14, wherein at least one of the converting of the reception signal, the generating of the low frequency signal, the filtering of the noise, and the generating of the analog signal includes a period in which an operation is periodically stopped according to a reset signal.

* * * * *